United States Patent [19]

Mitsuhashi

[11] Patent Number: 5,537,106
[45] Date of Patent: Jul. 16, 1996

[54] REMOTE CONTROLLER

[75] Inventor: Takamichi Mitsuhashi, Saitama, Japan

[73] Assignee: Sony Corporation, Tokyo, Japan

[21] Appl. No.: 90,487

[22] Filed: Jul. 12, 1993

Related U.S. Application Data

[63] Continuation of Ser. No. 741,056, Aug. 6, 1991, abandoned.

[30] Foreign Application Priority Data

Aug. 24, 1990 [JP] Japan ................................. 2-224006

[51] Int. Cl.⁶ .................................................. G08C 19/00
[52] U.S. Cl. .............................. 340/825.72; 340/825.24; 340/825.25; 340/825.69; 340/825.37; 341/175; 341/176; 341/27
[58] Field of Search ..................... 340/825.72, 825.69, 340/825.24, 825.25, 825.37; 341/173, 175, 176, 27; 348/734; 360/137, 85, 95, 97.01; 369/75.1; 62/126; 236/51; 187/395

[56] References Cited

U.S. PATENT DOCUMENTS

| | | | |
|---|---|---|---|
| 4,223,987 | 9/1980 | Shimizu et al. | 354/23 D |
| 4,322,855 | 3/1982 | Mogi et al. | 455/151 |
| 4,340,799 | 7/1982 | Ueda et al. | 367/198 |
| 4,365,633 | 12/1982 | Loughman et al. | 128/419 PG |
| 4,418,416 | 11/1983 | Lese et al. | 375/5 |
| 4,673,911 | 6/1987 | Yoshida | 187/100 |
| 4,728,936 | 3/1988 | Guscott et al. | 341/27 |
| 4,728,949 | 3/1988 | Platte et al. | 340/825.69 |
| 4,746,919 | 5/1988 | Reitmeier | 340/825.72 |
| 4,825,209 | 4/1989 | Sasaki et al. | 340/825.72 |
| 4,855,725 | 8/1989 | Fernandez . | |
| 5,097,671 | 3/1992 | Jeong-Hun | 62/126 |

FOREIGN PATENT DOCUMENTS 2215928  9/1989  United Kingdom .

Primary Examiner—John K. Peng
Assistant Examiner—Andrew Hill
Attorney, Agent, or Firm—Jay H. Maioli

[57] ABSTRACT

A remote control system comprising a remote commander and an electronic device main unit, in which the remote commander transmits a command signal to the electronic device main unit, the electronic device main unit receives the command signal, and the electronic device main unit transmits a signal that represents a setting state of the electronic device main unit. The remote commander receives the signal from the main unit and the remote commander displays the setting state of the electronic device main unit so that it can be checked by the user.

5 Claims, 29 Drawing Sheets

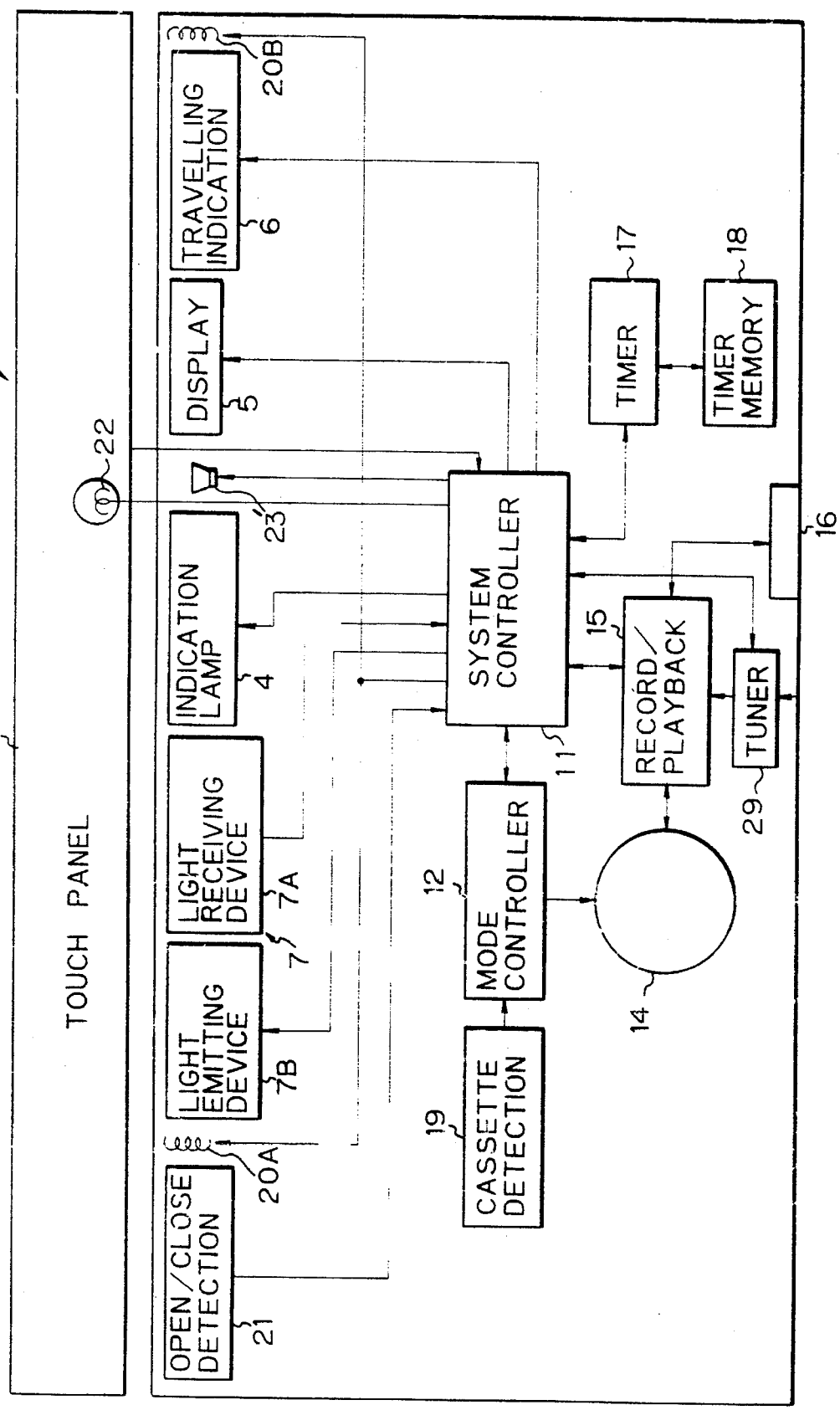

| NUMBER BUTTON | VIDEO | TELEVISION |
|---|---|---|
| 1 | COMPANY A VTR1 | COMPANY A TV |
| 2 | COMPANY A VTR2 | COMPANY A BS TUNER |
| 3 | COMPANY A VTR3 | COMPANY A TV |
| 4 | COMPANY B VTR | COMPANY B TV |
| 5 | COMPANY C VTR | COMPANY C TV |
| 6 | COMPANY D VTR | COMPANY D TV |
| 7 | COMPANY E VTR | COMPANY E TV |
| 8 | COMPANY F VTR | COMPANY F TV |
| 9 | COMPANY G VTR | COMPANY G TV |
| 10 | COMPANY H VTR | COMPANY H TV |
| 11 | COMPANY I VTR | COMPANY I TV |
| 12 | COMPANY J VTR | COMPANY J TV |

REMOTE CONTROLLER

This is a continuation of application Ser. No. 07/741,056, filed Aug. 6, 1991, abandoned.

BACKGROUND OF THE INVENTION

1. Field of the Invention

The present invention relates generally to a remote control system for operating an electronic device, such as a Video Tape Recorder (VTR) or the like and, more particularly, to a remote controller that can display the operating state of the electronic device being controlled.

2. Description of the Background

A remote controller or remote commander is typically used to remotely operate a VTR. In a conventional remote commander, keys are assigned in accordance with individual operations. When a key on the remote commander is pressed, the corresponding command signal is transmitted from the remote commander to the VTR main unit and the VTR main unit receives the command signal. When the VTR main unit receives the command signal from the remote commander, the operation of the VTR main unit is set in accordance with the command signal transmitted from the remote commander.

In the conventional remote commander, a command signal is unidirectionally transmitted from a remote commander to the VTR main unit. Thus, on the remote commander side, the user neither checks the operational state of the VTR main unit nor physically sets the operation thereof.

For example, the user may want to check and change a timer setting state of the VTR main unit, however, in the conventional remote commander, since the signal is unidirectionally transmitted from the remote commander to the VTR main unit, the timer setting state of the VTR main unit cannot be transmitted to the remote commander. Thus, the user cannot check the timer setting state of the VTR main unit on the remote commander side.

In the conventional remote commander, the signal is unidirectionally transmitted, so that information such as the remaining amount of tape and the record time can not be transmitted from the VTR main unit to the remote commander, and the user cannot check such status on the remote commander side.

OBJECTS AND SUMMARY OF THE INVENTION

It is, therefore, an object of the present invention is to provide a remote control system for checking a setting state of the main unit of an electronic device.

Another object of the present invention is to provide a remote control system for checking a setting of the main unit of an electronic device and then for changing the setting state thereof.

Still another object of the present invention is to provide a remote control system for checking a communication state between the remote commander and the main unit of an electronic device.

In accordance with an aspect of the present invention, there is provided a remote control system comprising a remote commander and a main unit of an electronic device, wherein the remote commander transmits a command signal to the main unit and the main unit receives the command signal. The main unit then transmits a signal that represents a setting state of the main unit, the remote commander receives the signal which represents the setting state of the main unit, and the remote commander displays the setting state of the main unit in order to permit the user to check it.

In accordance with another aspect of the present invention, there is provided a remote control system, wherein the setting state of the main unit of the electronic device is indicated on a display of the remote commander and then checked, and the setting state of the main unit is then changed using the remote commander, a command signal for changing the setting state being transmitted from the remote commander to the main unit so as to change the setting state.

In accordance with still another aspect of the present invention, there is provided a remote control system, wherein a display of the remote commander indicates a transmission message indication upon transmission of a command signal from the remote commander to the main unit of the electronic device, and the display of the remote commander indicates a reception indication upon reception of a signal which represents a setting state from the main unit.

The remote commander can bidirectionally communicate with the VTR main unit. In other words, the remote commander transmits a command signal which sets the VTR main unit, the VTR main unit receives the command signal, and when necessary, the VTR main unit transmits signals that represent operation information, such as playback, stop, pause, and record, and status information, such as record mode, input mode, record time, tape remaining amount, and timer information. The remote commander receives a signal which represents an operation state of the VTR main unit.

Thus, when the setting state of the VTR main unit is indicated on a character indicating portion of the remote commander, the setting state of the VTR main unit can be checked on the remote commander. In addition, after the setting state of the VTR main unit is checked on the remote commander the setting state can be changed using the remote commander.

Moreover, when a command signal is transmitted from the remote commander to the VTR main unit, a transmission message indication is indicated on the character indicating portion. On the other hand, when the remote commander receives a signal that represents a setting state from the VTR main unit, the character indicating portion indicates the quality of the reception, so that the user can check the communication state between the remote commander and the VTR main unit.

The above and other objects, features, and advantages of the present invention will become readily apparent from the following detailed description thereof, which is to be read in connection with the accompanying drawings.

BRIEF DESCRIPTION OF THE DRAWINGS

FIG. 2 is a block diagram showing the internal construction of the VTR according to an embodiment of the present invention;

DETAILED DESCRIPTION OF PREFERRED EMBODIMENTS

Now, an embodiment according to the present invention will be described in the following order.

a. Outline of the VTR main unit;
b. Internal construction of the VTR main unit;
c. Door opening mechanism;
d. Outline of the remote commander;
e. Internal construction of the remote commander;
f. Key assignment of the touch panel;
g. Key operation with respect to the erasing operation;
h. Cleaning mode;
i. Indication of display;
j. Modes of the remote commander;
k. Basic operating method of the remote commander;
l. Processing when time has not been set;
m. Setting of the calendar and current time;
n. Setting of the timer;
o. Memory bank functions;
p. Check and change of reserved contents; and
q. Operations of other devices.

a. Outline of VTR main unit

Figure 1A:
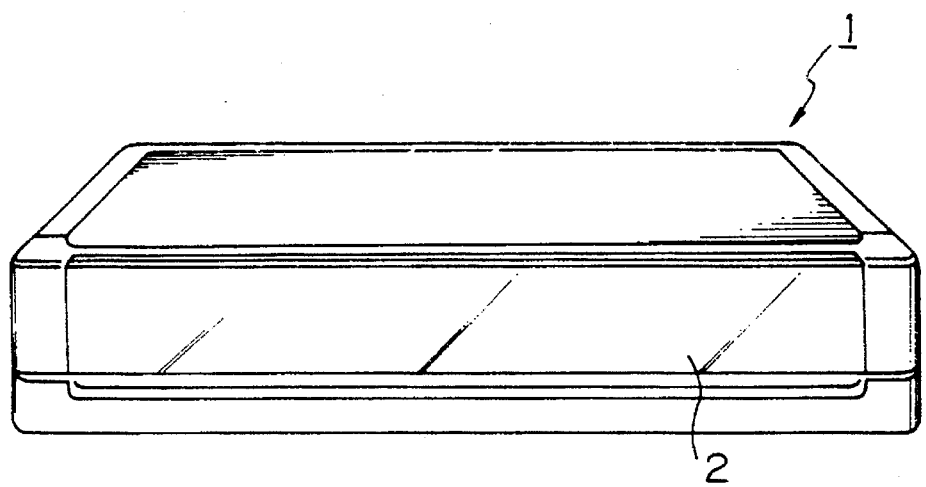
FIG. 1A and 1B are perspective views showing the overall construction of a VTR according to an embodiment of the present invention.
Figure 1B:
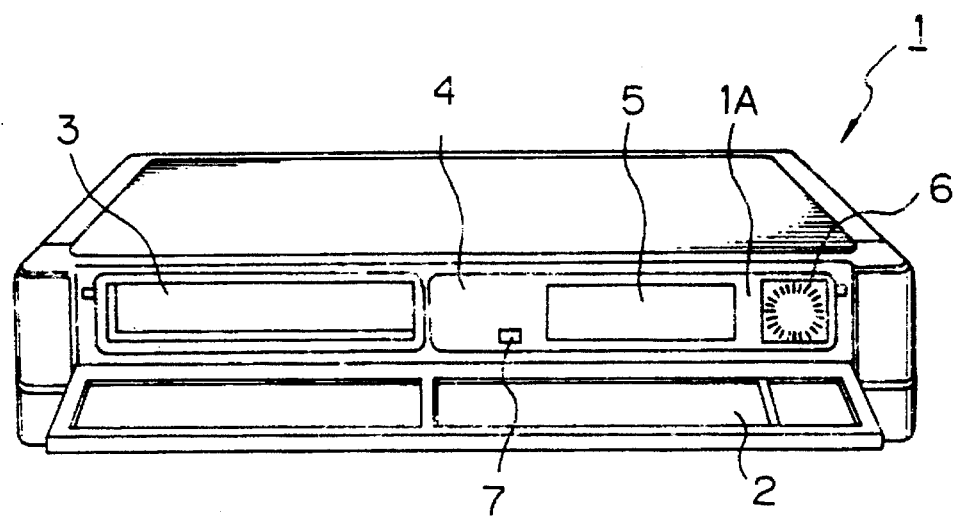

FIGS. 1A and 1B are perspective views showing the overall appearance of a VTR main unit 1 according to the present invention. As shown in these figures, on the front surface of the VTR main unit 1 a transparent touch panel 2 is provided as a door that fully covers a front panel 1A of the main unit and that can be opened and closed. FIG. 1A is a perspective view showing the state where the transparent touch panel 2 is closed. FIG. 1B is a perspective view showing the state where the transparent touch panel 2 is open. As will be described below, the transparent touch panel 2 is provided with a plurality of operation keys. When the transparent touch panel 2 is opened, as in FIG. 1B, and an operation key thereon is operated, the state of the VTR 1 is set. As will be described below, the transparent touch panel 2 can be opened by the operation of an eject key 150 on the remote commander 10, as will be shown in FIG. 10I.

As shown in FIG. 1B, when the transparent touch panel 2 disposed on the front surface of the VTR main unit 1 is opened, a cassette loading entrance 3 is exposed for loading a cassette into the VTR. Arranged on the front panel 1A of the VTR main unit 1 are an indication portion 4 for indicating the operational states of power ON/OFF, a record mode, an auto tracking mode, and so forth and a tape traveling state indicating portion 6. As will be described below, the display 5 can selectively indicate an adjustment state of tracking, audio level, sharpness, and so forth. Because the touch panel 2 is transparent, even if it is closed the indications of the indication portion 4, the display 5, and the tape traveling state indicating portion 6 can still be viewed.

On the front panel 1A of the VTR main unit 1, a light emitting/receiving portion 7 is disposed. The operational state of the VTR main unit 1 can be remotely operated with the remote commander, not shown, but which will be described in detail below. The remote commander can bidirectionally communicate with the VTR main unit 1, and a command signal from the remote commander is transmitted using an infrared ray. This signal from the remote commander is received by the light emitting/receiving portion 7. When necessary, signals representing the operational state of the VTR such as playback, stop, pause, record, and so forth; status information, such as record mode, input mode, record time, tape remaining amount, and so forth; and timer information, such as timer reservation, reservation check, current time, and so forth are transmitted from the light emitting/receiving portion 7 of the VTR main unit 1 to the remote commander with the infrared ray signals.

As described above, on the front panel 1A of the VTR main unit 1, the transparent touch panel 2 is mounted for opening and closing. With the operation of the keys on the transparent touch panel 2, various operational states can be set. Thus, since it is not necessary to dispose a plurality of keys on the front panel 1A, the design of the VTR main unit 1 can be improved. In addition, since the operation keys disposed on the transparent touch panel 2 can be operated using only a light touch, the operability is improved. Moreover, since the transparent touch panel 2 is transparent, even if the transparent touch panel 2 is closed, various indications can be viewed by the user.

b. Internal construction of VTR main unit

FIG. 2 is a schematic diagram showing the internal construction of the VTR main unit 1, in which reference numeral 11 is a system controller 11 and reference numeral 12 is a mode controller. The system controller 11 and the mode controller 12 are bidirectionally connected.

When an operation key disposed on the transparent touch panel 2 mounted on the front surface of the VTR main unit 1 is pressed, an operation signal is sent from the touch panel 2 to the system controller 11.

On the other hand, when an operation key disposed on the remote commander (not shown) is operated, a command signal is transmitted from the remote commander. The command signal is received by a light receiving device 7A and the signal sent from the light receiving device 7A to the system controller 11. In addition, when necessary, a signal representing the setting state of the VTR main unit 1 is output from the system controller 11 and transmitted from a light emitting device 7B. Thus, when the signal representing the setting state of the VTR main unit 1 is output from the system controller 11 and transmitted from light emitting device 7B the system controller and light emitting device function as an automatic transmitter.

When a command signal is sent to the system controller 11, this command is fed to the mode controller 12 and the mode controller 12 sets the operational mode. Depending upon the operational state being set, the indication lamp 4, the display 5, and the tape traveling state indicating portion 6 are activated.

The operational state of the well-known rotary head drum 14 is set by the mode controller 12. In the playback state, the rotary head on the drum 14 plays back signals recorded on the tape, and the reproduced signal is sent to a record/playback circuit 15. The record/playback circuit 15 demodulates a luminance signal from the FM modulation luminance signal being reproduced and then converts a carrier frequency of a low-band conversion chroma signal being reproduced to a predetermined frequency, for example, 3.58 Mhz. The reproduced signal is output from input/output terminal 16.

In the record state, a video signal from a tuner circuit 29 or the input/output terminal 16 is sent to the record/playback circuit 15. Thereafter, the luminance signal is FM modulated, the chroma signal converted to a low band, and the resultant signal recorded on the tape through the rotary head of the drum 14.

When the power of the VTR main unit 1 is turned on by operation of the remote controller, the drum 14 is rotated for a particular period of time, for example, thirty seconds. Thus, when the VTR main unit is turned on and then entered into the playback mode, playback images can be immediately output.

In the record mode, three types of modes (for example, Beta I, Beta II, and Beta III) which differ in tape speeds can also be set. In addition, the normal mode and the high band mode can be set.

Reference numeral 17 is a timer circuit and by using the timer circuit 17, a timer controlled recording operation can be performed. The timer information that is set in the timer record mode is stored in a timer memory 18. The time that is set on the timer circuit 17 is indicated on the display 5. The timer 17 is set by an operation using the remote commander, which operation will be described below. The timer information stored in the timer memory 18 can be sent back to the remote commander and then rewritten thereinto.

Reference numeral 19 is a cassette detection circuit that detects whether or not a cassette is mounted in the VTR main unit 1. The output of the cassette detection circuit 19 is sent to a mode controller 22.

When a television broadcast image is output by using the tuner circuit 29 of the VTR main unit 1, the power of the VTR main unit i is turned on in the state where the cassette is not inserted therein. Thus, when the VTR main unit 1 is turned on and the cassette is not inserted, it is possible to use the tuner circuit 29 of the VTR main unit 1 and to indicate a channel on the display 5. In this construction, when a television broadcast image is output by using the tuner circuit 29 of the VTR main unit 1, the channel can be clearly indicated.

Reference numerals 20A and 20B are door opening mechanisms of the transparent touch panel 2. As was described above, the transparent touch panel 2 of the VTR main unit 1 can be opened with the operation of the eject key on the remote commander. When an eject command signal is sent from the remote commander, the system controller 11 outputs a door open signal, and the door open signal is sent to the door open mechanisms 20A and 20B.

A door open/close detection circuit 21 detects the open/close state of the transparent touch panel 2 and can be comprised of a leaf switch, for example. When the door open/close detection circuit 21 detects that the transparent touch panel 2 is open, the eject operation is prohibited.

As will be described below, the transparent touch panel 2 is provided with various operational keys. Thus, because transparent touch panel 2 can be opened and closed, if the cassette is ejected when the transparent touch panel 2 is not completely open, the cassette may touch the operation keys disposed on the transparent touch panel 2, thereby causing the VTR main unit i to malfunction. To prevent such an occurrence, in the remote control system according to the present embodiment the door open/close detection circuit 21 detects the open/close state of the transparent touch panel 2. When the transparent touch panel 2 is open, the door open/close detection circuit 21 prohibits the eject operation from being performed so as to prevent such a malfunction.

Also arranged on the transparent touch panel 2 is a lamp 22 for lighting up the panel. When the transparent touch panel 2 is opened, the lamp 22 lights up. In addition, when the transparent touch panel 2 is operated, a speaker 23' generates an operation sound so as to provide a sense of security to the user that the desired operation is taking place.

c. Door open mechanism

Figure 3A:
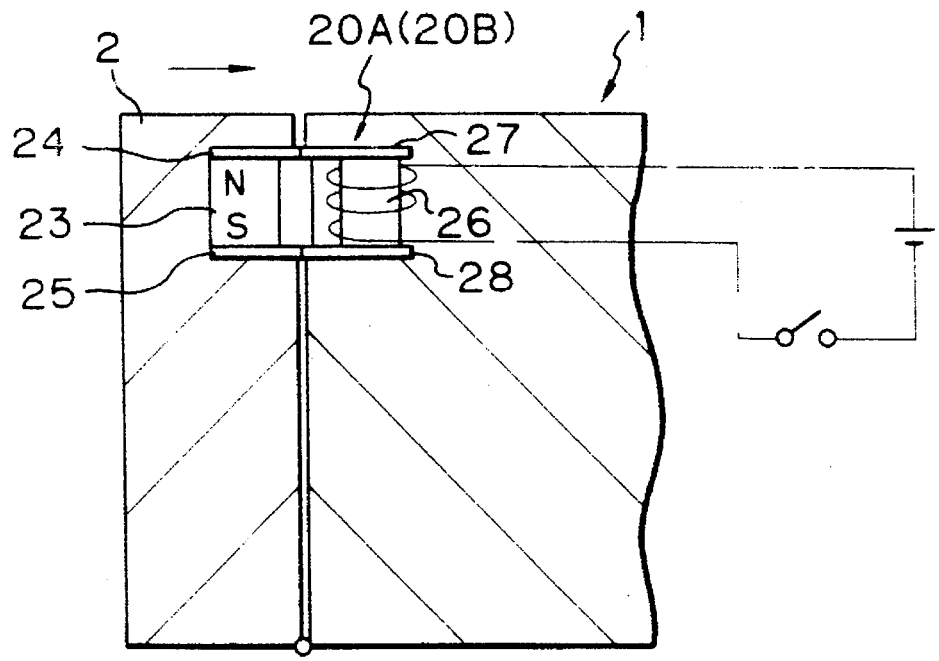
FIG. 3A and 3B are sectional views describing door opening mechanisms of the VTR according to an embodiment of the present invention.
Figure 3B:
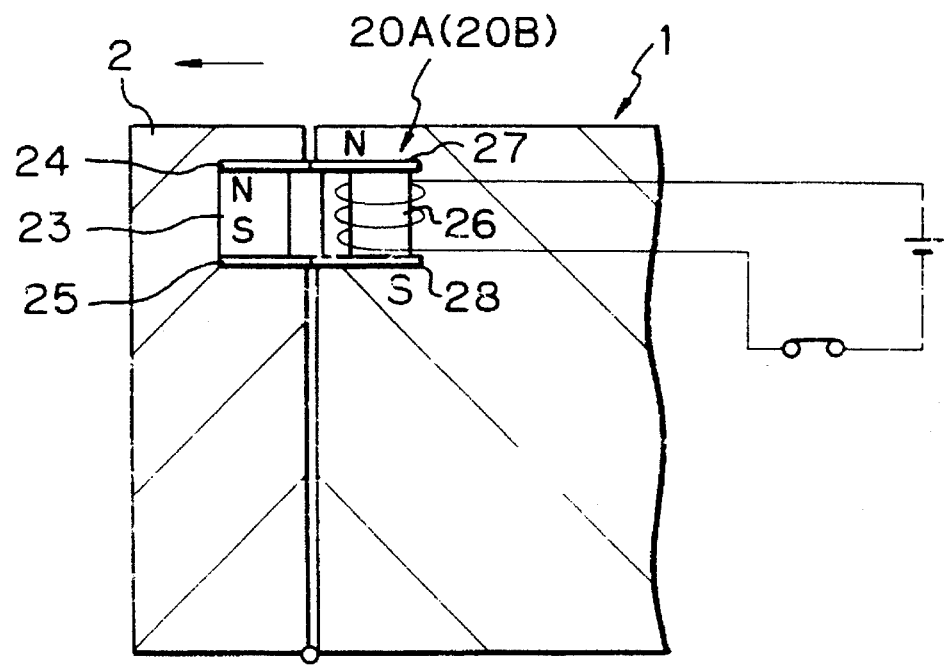

FIGS. 3A and 3B show constructions of the door open mechanisms 20A and 20B. Each of the door open mechanisms 20A and 20B is comprised of a magnet 23 and iron pieces 24 and 25 that are disposed on the transparent touch panel 2; and a solenoid coil 26, and iron pieces 24 and 25 that are disposed on the VTR main unit 1. By controlling the current that flows in the solenoid coil 26, the transparent touch panel 2 can be opened.

As shown in FIG. 3A, when the current does not flow in the solenoid coil 26, by means of the magnetic force of the permanent magnet 23 the iron pieces 24 and 25 attract the iron pieces 27 and 28, respectively. Thus, the transparent touch panel 2 is kept closed.

As shown in FIG. 3B, when the current flows in the solenoid coil 26, a magnetic field is produced in the solenoid coil 26 in the same direction as that of the permanent magnet 23. Thus, the iron pieces 24 and 25 repel the iron pieces 27 and 28, respectively, thereby opening the transparent touch panel 2.

As was described above, since the door open mechanisms 20A and 20B can be constructed without motors, their cost is low. In addition, since the door open mechanisms 20A and 20B do not generate the sound of a motor, the transparent touch panel can be very calmly and quietly opened.

d. Outline of remote commander

Figure 4:
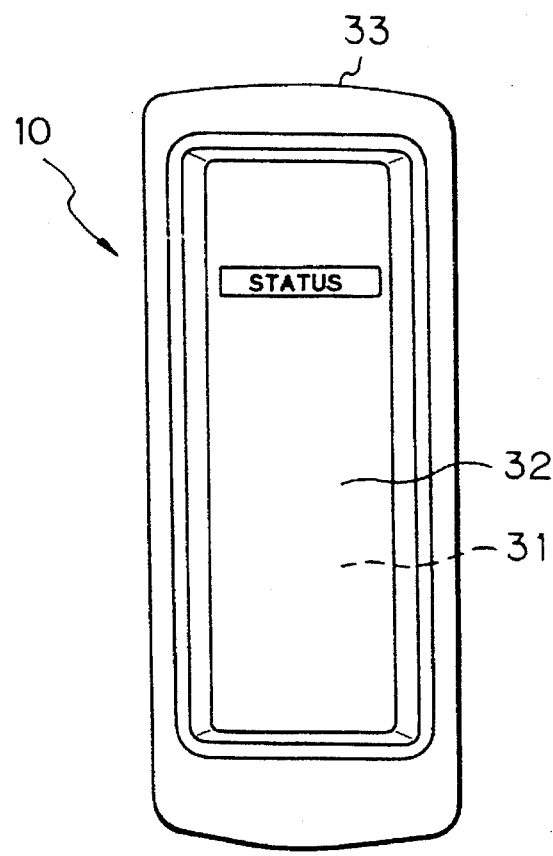
FIG. 4 is a plan view showing the overall construction of a remote commander for the VTR according to an embodiment of the present invention.
Figure 5:
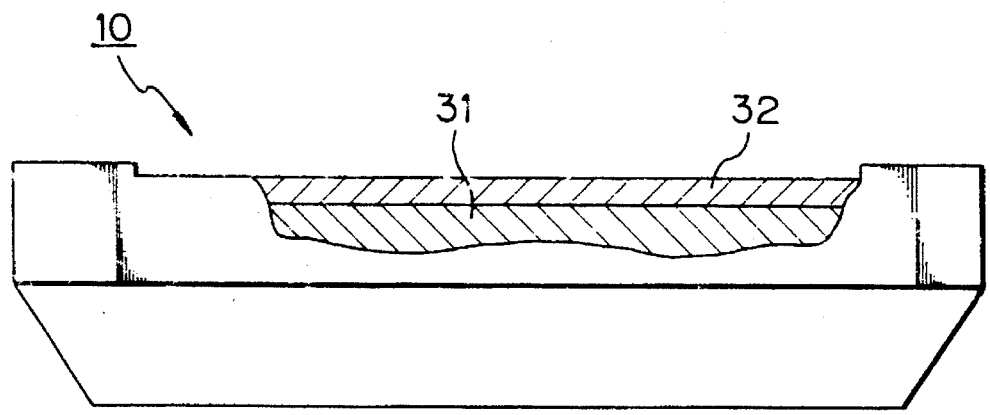
FIG. 5 is a sectional view showing a portion of the remote commander for the VTR according to an embodiment of the present invention.

FIG. 4 is an external view of the remote commander 10 used for operating the VTR main unit 1. As shown in FIG.

5, the remote commander 10 is provided with an LCD display 31. On top of the LCD display 31 is arranged a touch panel 32. On the LCD display 31 keys are indicated, so that when various operations are to be set the appropriate key on the touch panel 32 is pressed.

The remote commander 10 can be set to various modes. In accordance with each mode, the key assignment indicated on the LCD display 31 can be changed. Since the key assignment can be changed in accordance with each mode, the key assignment can be simplified, thereby preventing key operations from being mistaken and allowing various complicated operations to be set. The modes and key assignment of the remote commander 10 will be described below.

The remote commander 10 can bidirectionally communicate with the VTR main unit 1, and on the front surface of the remote commander 10 is disposed a light emitting/receiving portion 33. A command signal is transmitted from the light emitting/receiving portion 33 of the remote commander 10 using an infrared ray. Similarly, a signal representing the operational state of the VTR main unit 1 is transmitted therefrom also using an infrared ray signal. The signal is received by the light emitting/receiving portion 33 of the remote commander 10.

e. Internal construction of remote commander

Figure 6:
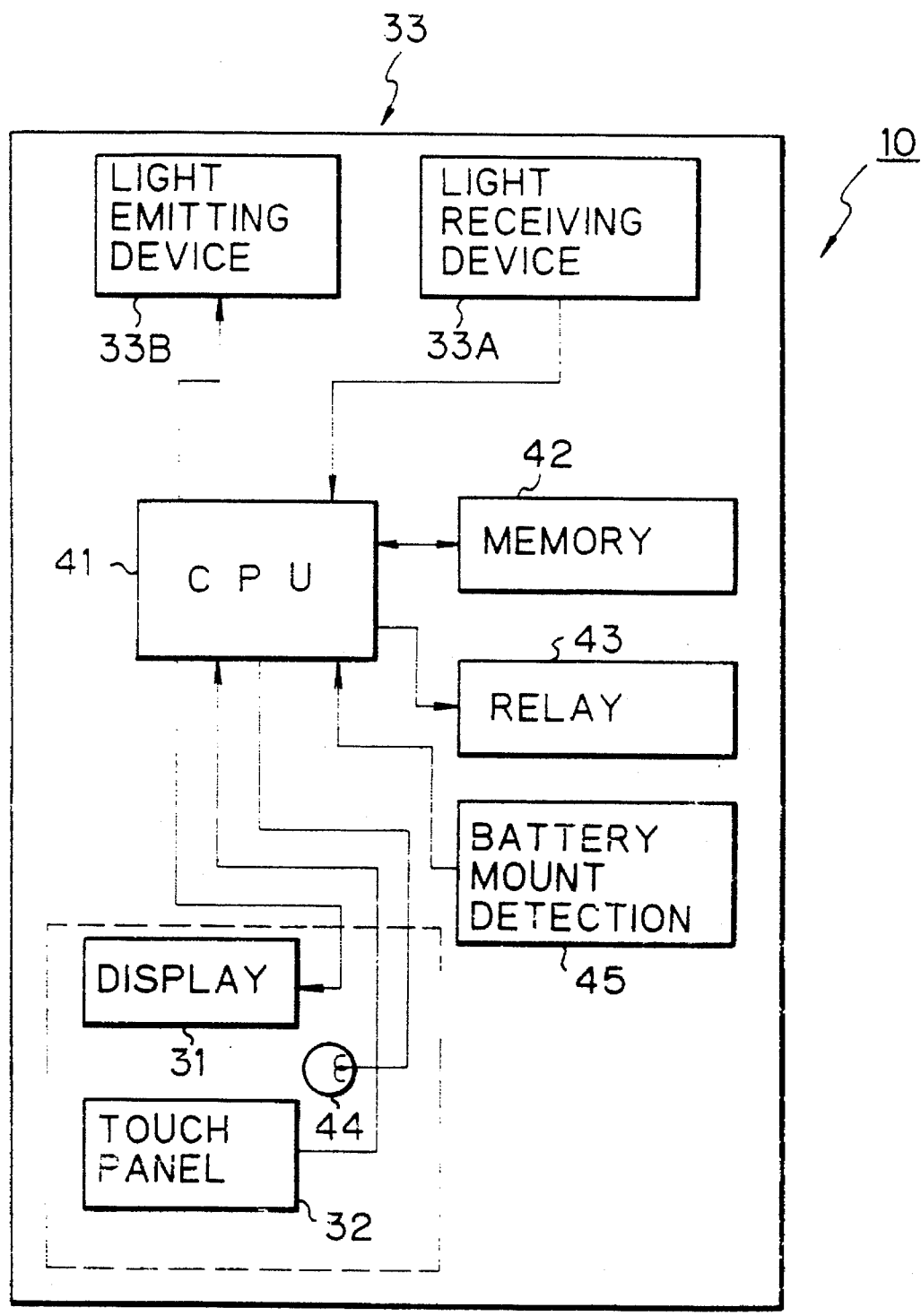
FIG. 6 is a block diagram showing the internal construction of the remote commander of the VTR according to an embodiment of the present invention.

FIG. 6 is a schematic diagram showing the internal construction of the remote commander 10. The remote commander 10 is provided with a CPU 41, and the CPU 41 is bidirectionally connected with a memory 42 along with the display 31 and the touch panel 32. As was described earlier, the display 31 and the touch panel 32 are layered and unified.

The display 31 indicates keys so that when in accordance with the key indication the touch panel 32 is pressed by a user the CPU 41 transmits a command signal. This command signal is transmitted with an infrared ray signal from a light emitting device 33B to the VTR main unit 1. Thus, the remote commander functions as a user operable transmitter.

When the touch panel 32 is pressed, a relay 43 generates an operational sound. The sound of the relay 43 customarily takes place as a switch operation completion sound and is therefore suitable for a source of the operational sound. In addition, while the operational sound of the remote commander 10 is the relay sound, the operational sound VTR main unit 1 is a buzzer sound of the speaker 23' shown in FIG. 2. Thus, since the user can identify the operations of the remote commander 10 from those of the touch panel 2 of the VTR main unit 1, the operability is improved.

A signal transmitted from the VTR main unit I is received with the light receiving device 33A and then sent to the CPU 41. When necessary, the signal transmitted from the VTR main unit 1 is indicated on the display 31.

A lamp 44 for lighting up the display 31 and the touch panel 32 is provided on the remote commander 10. When the lamp 44 is energized, the setting state of the VTR main unit 1 can be checked even in a dark place. In addition, in such a low light situation, the operation of the VTR main unit 1 can be set. As will be described below, when a "?" key 122 functioning as a help key is pressed, the lamp 44 is lighted.

A battery mount detection circuit 45 detects whether or not the battery is mounted.

f. Key assignment of touch panel

Figure 7:
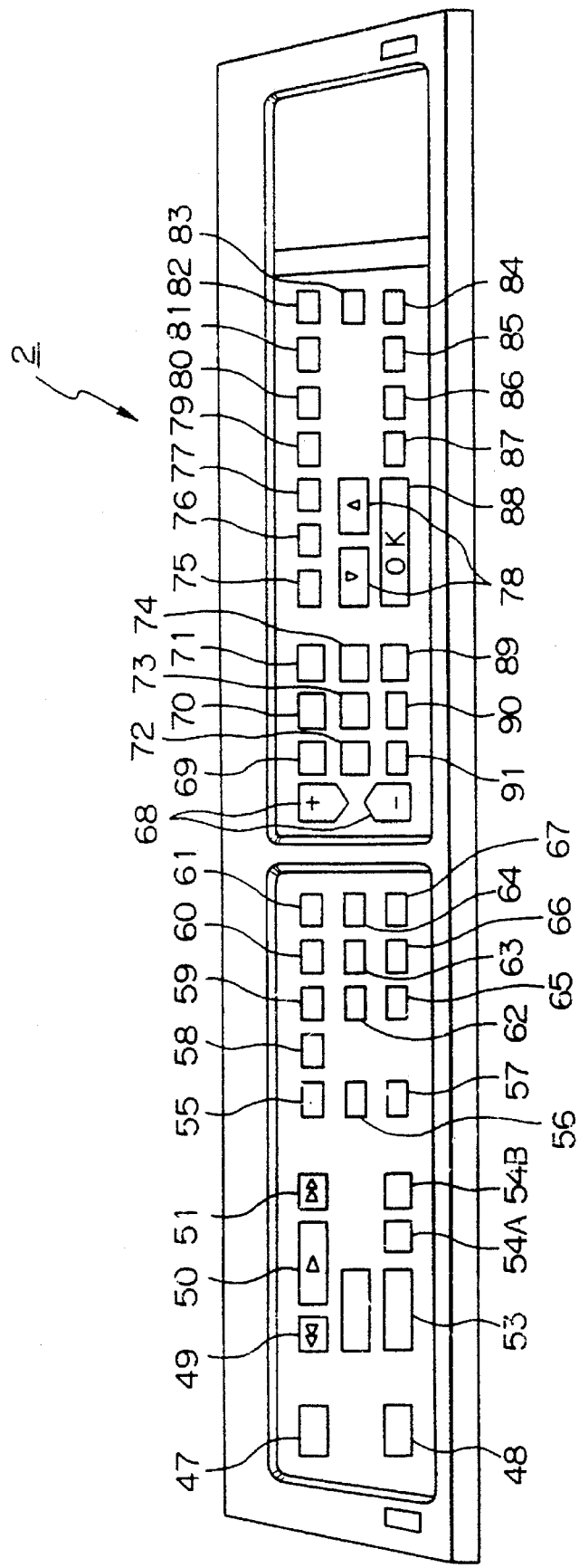
FIG. 7 is a perspective view showing the key assignment of a transparent touch panel of the VTR according to an embodiment of the present invention.

Now, the touch panel 2 which can be opened and closed on the front of the VTR main unit 1 will be described. FIG. 7 is a schematic diagram showing the key assignment of the touch panel 2. The touch panel 2 is provided with keys for performing basic operations such as a power key 47, an eject key 48, a rewind key 49, a playback key 50, a fast forward key 51, a pause key 52, a stop key 53, and record keys 54A and 54B. In addition, the touch panel 2 is provided with a quick timer set key 55, a timer record key 56, a record mode key 57, a television/video selection key 58, a counter reset key 59, a counter indication/tape remaining indication selection key 60, and a tape return key 61.

The touch panel 2 is also provided with index function keys such as index key 62, an index mark key 63, and an index erase key 64. In addition, the touch panel 2 is provided with input selection keys 65, 66, and 67. Furthermore, the touch panel 2 is provided with channel up/down keys 68, a high-band key 69, a Beta I S/SHB selection key 70, and a main/sub selection key 71. In addition, the touch panel 2 is provided with edit keys, such as an audio insert edit key 72, a video insert edit key 73, a synchronous edit key 74, and so forth.

The touch panel 2 is provided with a record level key 75, a tracking key 76, a sharpness key 77, and adjustment up/down keys 78. The touch panel 2 is also provided with various set/selection keys such as a buzzer key 79 for changing the operation sound, a tape select key 80, an edit function selection key 81, an audio monitor key 82, a timer online function selection key 83, a BNR playback selection key 84, a CATV key 85, an auto stereo key 86, a remote commander mode selection key 87, an indication restoration OK key 88, an auto tracking key 89, and so forth.

In addition, the touch panel 2 is provided with tuner preset keys such as a tuner label key 90, a tuner preset key 91, and so forth.

g. Key operation with respect to a tape erasing operation

When each key of the transparent touch panel 2 disposed in the above-mentioned construction on the VTR main unit 1 is pressed, the corresponding operation is set. The key operation of the transparent touch panel 2 can be readily performed by lightly touching the corresponding key with the user's finger. In addition, as was described hereinabove, the key operation can be checked with the buzzer sound of the speaker 23.

Nevertheless, because the input operation can be easily performed, a malfunction due to operating an incorrect key tends to take place. In particular, it is necessary to prevent any undesired operation with respect to the erasing and/or recording of the tape from being inadvertently set. To do that the VTR according to the present invention is equipped with the capability for preventing key operations, with respect to erasing and/or recording the tape, from being inadvertently selected. More specifically, the quick timer set key 55 and the timer record key 56 cannot be set unless they are pressed continuously for several seconds. In addition, the record keys 54A and 54B cannot be set unless they are pressed simultaneously for several seconds.

h. Clean mode

As was described hereinabove, as each key on the transparent touch panel 2 of the VTR main unit 1 is pressed, the corresponding operation is set. As might be expected because each key on the transparent touch panel 2 is frequently operated, the surface of the transparent touch panel 2 becomes dirty with finger prints and normal grime. Nevertheless, if the transparent touch panel 2 is simply cleaned with a cloth or the like, the keys on the transparent touch panel 2 will be pressed, so that the VTR main unit 1 may malfunction.

To prevent that malfunctioning, the VTR main unit 1 according to the present invention is provided with a clean mode for disabling all key operations of the transparent touch panel 2. More specifically, when both the power key 47 and the OK key 88 are pressed at the same time, the clean mode is set. In the clean mode, all the key operations of the transparent touch panel 2 are disabled. Thus, in this clean mode, the transparent touch panel 2 can be cleaned with by using reasonable pressure and a cloth without such the problem of appearing to make desired selections. In the clean mode, a message "PLEASE CLEAN THE PANEL" is indicated on the display 5 so as to inform the user that the VTR main unit 1 has been entered into the clean mode.

When any key of the remote commander 10 is pressed or when the power key 47 and the OK key 88 are pressed at the same time, the VTR main unit 1 is restored back to the normal operation mode.

i. Indication of display

Normally, display 5 of the VTR main unit 1 indicates the counter, time, input mode, tape mode, channel, and so forth at the same time.

In the VTR according to the present invention, the tracking adjustment can be electronically performed with the operations of the tracking key 76 and the adjustment up/down keys 78. In addition, the sharpness adjustment can be performed with the operation of the sharpness key 77 and the adjustment up/down keys 78. When such electric adjustments are performed, it is necessary to indicate the adjustment states. To indicate the setting states, the display 5 is used, however, the indication area of the display 5 is limited.

Figure 8A:
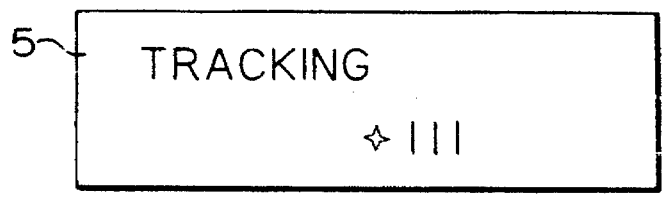
FIGS. 8A to 8C are schematic diagrams describing a display of the VTR according to an embodiment of the present invention.

In the embodiment according to the present invention, the indications of the display 5 can be selectively changed depending on whether the VTR main unit 1 is entered into the normal mode or the adjustment mode. For example, when the tracking adjustment is performed the tracking key 76 is pressed. At that time, as shown in FIG. 8A, the display 5 indicates a message "TRACKING" and a bar chart representing the adjustment state. The user can perform the tracking adjustment with the adjustment up/down keys 78 while observing the bar chart. When the tracking adjustment is performed, the normal indication disappears and instead a bar chart representing the state of the tracking adjustment appears on the entire surface of the display 5. Thus, the user can readily perform the tracking adjustment with a large sized bar chart. When the sharpness adjustment is performed, a bar chart representing the setting state of the sharpness appears over the entire surface of the display 5.

After the tracking adjustment and the sharpness adjustment have been performed, which generally takes several seconds, and the OK key 88 is pressed, the display 5 indicates the normal indication.

Figure 8B:
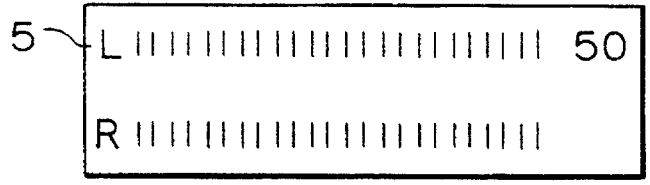

When the record level key 75 is pressed, as shown in FIG. 8B, the level meter is indicated over the entire surface of the display 5. The user can adjust the record level with the adjustment up/down keys 78 while observing the indication of the level meter.

When the OK key 88 is pressed, the display 5 indicates the normal indication but, unless the OK key 88 is pressed, the display 5 continuously indicates the level meter.

Figure 8C:
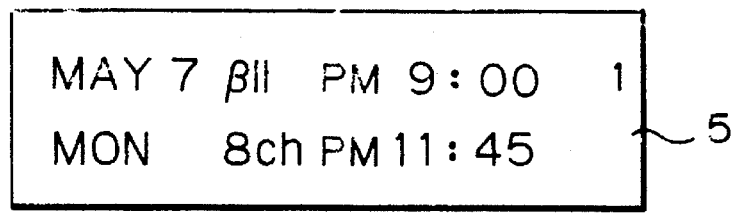

When a reserved program is checked, as shown in FIG. 8C, the display 5 indicates a reserved date, a record mode, a record start time, a reservation number, a reserved channel, and a record end time.

As was described above, according to this embodiment of the present invention, by using the limited indication area of the display 5, the proper date for the selected is indicated. In other words, when an adjustment is performed the display 5 indicates a bar chart representing the adjustment state on the entire surface of the display 5. On the other hand, in the normal mode or when the timer is checked, the display 5 indicates a plurality of data items so that the user can check various situations at the same time.

j. Modes of remote commander

Figure 9:
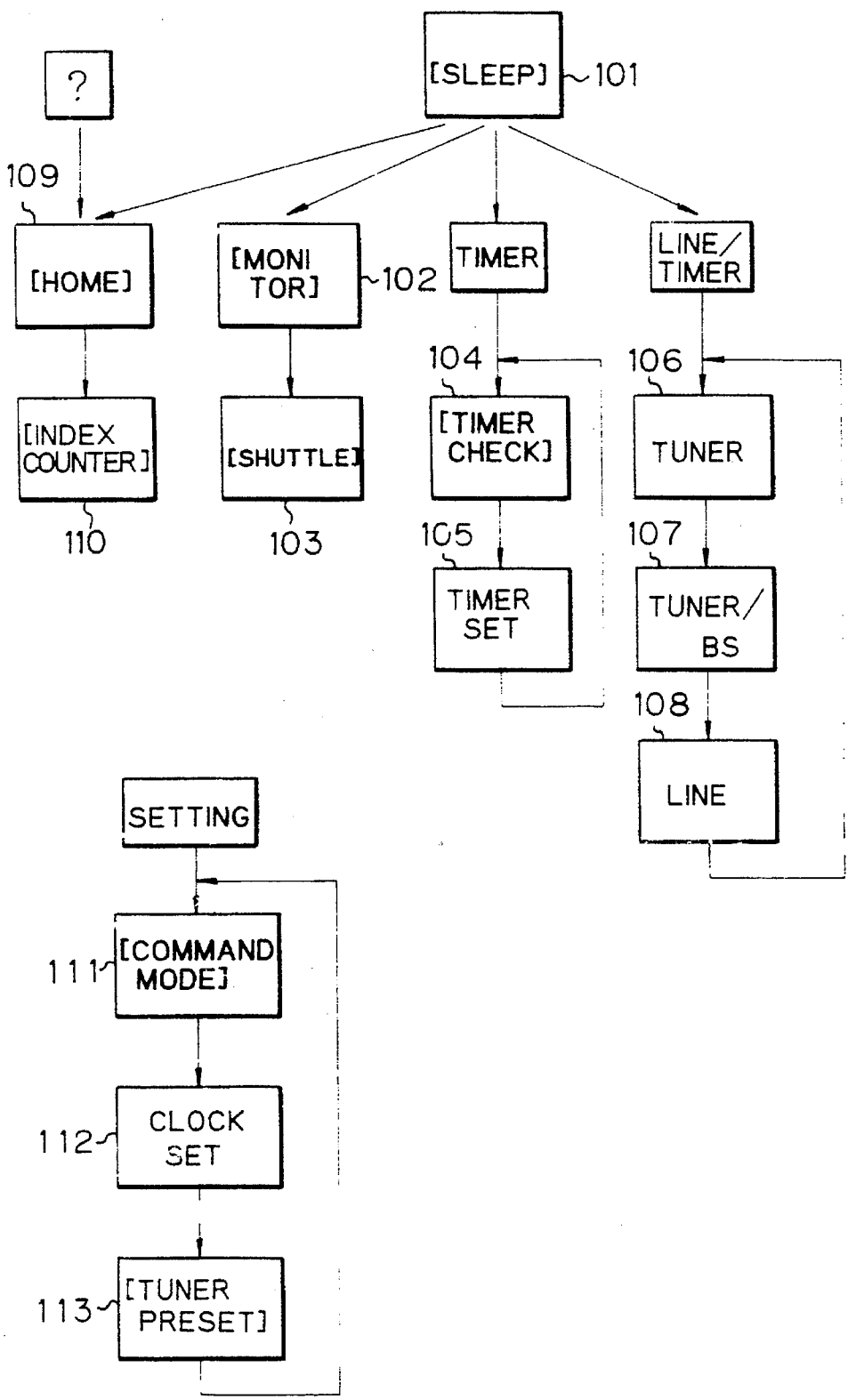
FIG. 9 is a state transition schematic diagram describing the remote commander of the VTR according to an embodiment of the present invention.
Figure 10A:
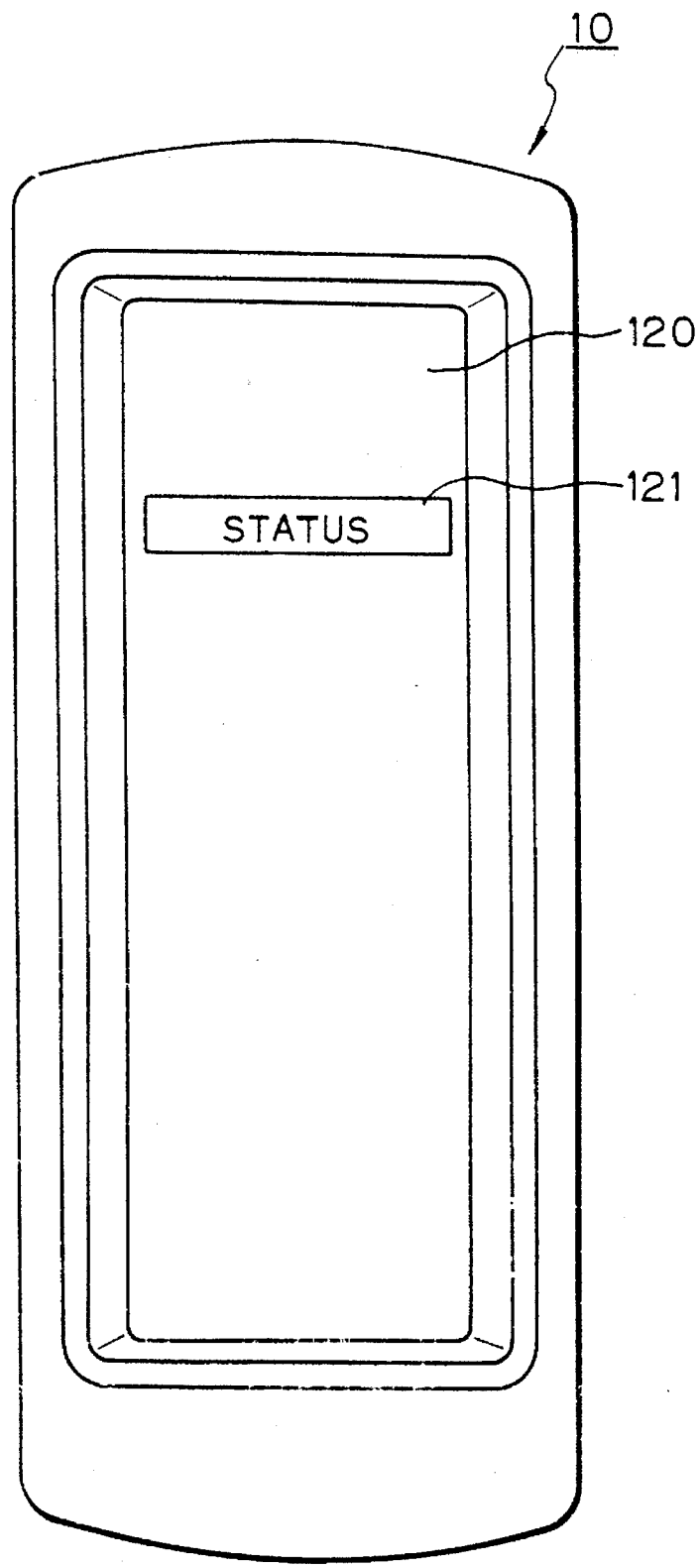
FIGS. 10A to 10M are plan views showing the remote commander of the VTR according to an embodiment of the present invention.

As described above, the remote commander 10 can be set to various modes and each of these modes of the remote commander 10 will now be described. FIG. 9 is a flow chart showing the transitions of each mode of the remote commander 10. When the battery is mounted for the first time or when the remote commander 10 is not operated for approximately 5 minutes, the remote commander 10 is entered into the [SLEEP] mode 101. FIG. 10A is a schematic diagram showing the key assignment in the [SLEEP] mode 101, in which all indications other than the status key 121 disappear.

Figure 10B:
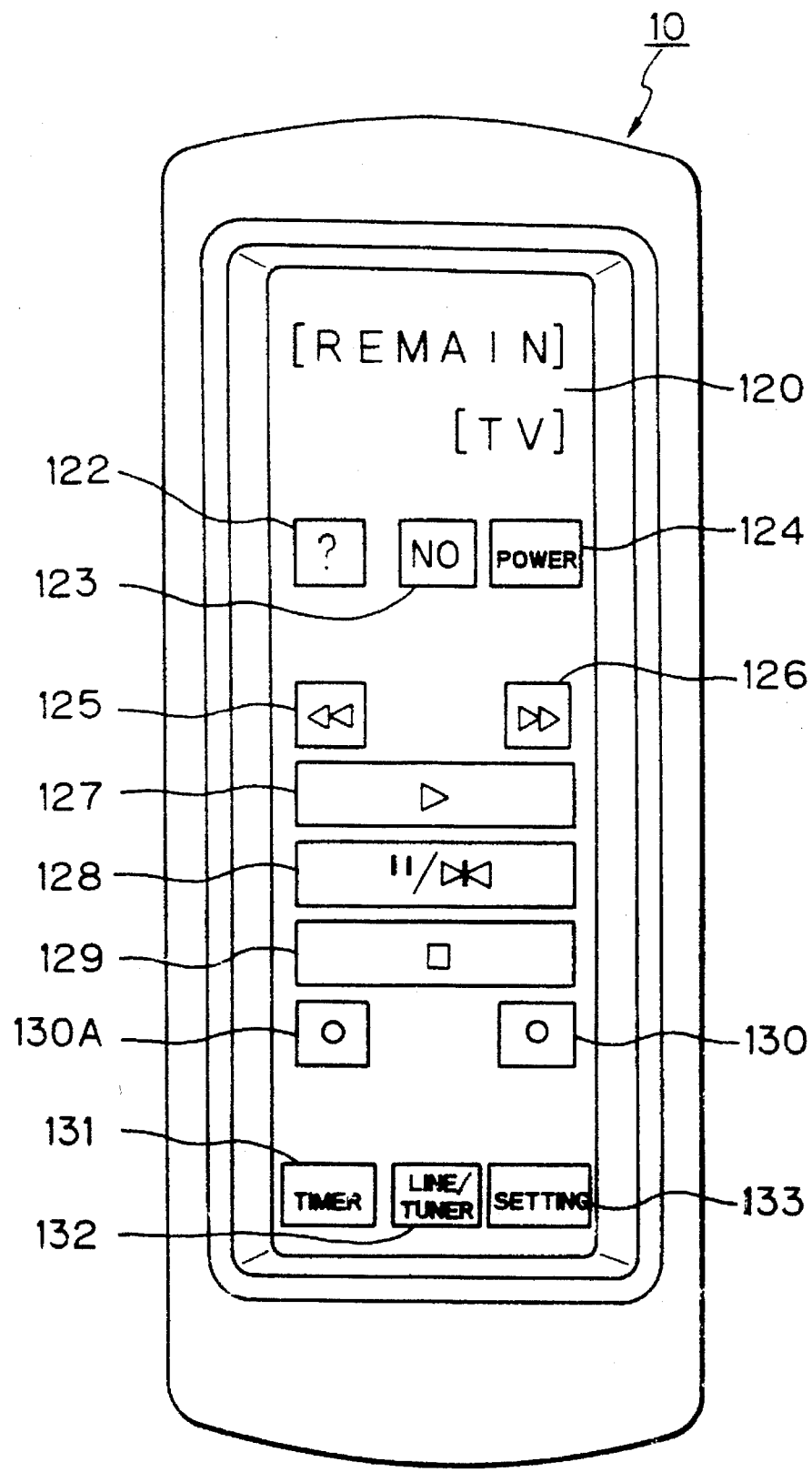

When the status key 121, as shown in FIGS. 9 and 10A, is pressed the remote commander is normally entered into the [MONITOR] mode 102. FIG. 10B is a schematic diagram showing the key assignment in the [MONITOR] mode 102. In the [MONITOR] mode 102, after a message [MONITOR] scrolls on the character indicating portion 120, the characters shown in FIG. 10B are indicated to the user. The indications in brackets of the character indicating portion 120 function as input keys. In addition, the character portion 120 indicates a "?" key 122, a "NO" key 123, and a "POWER" key 124. Moreover, the character indicating portion 120 indicates the basic operation keys such as a rewind key 125, a fast forward key 126, a playback key 127, a pause key 128, a stop key 129, and record keys 130A and 130B, for example. Furthermore, the character indicating portion 120 indicates a "TIMER" key 131, a "LINE/TUNER" key 132, and a "SETTING" key 133.

Figure 10C:
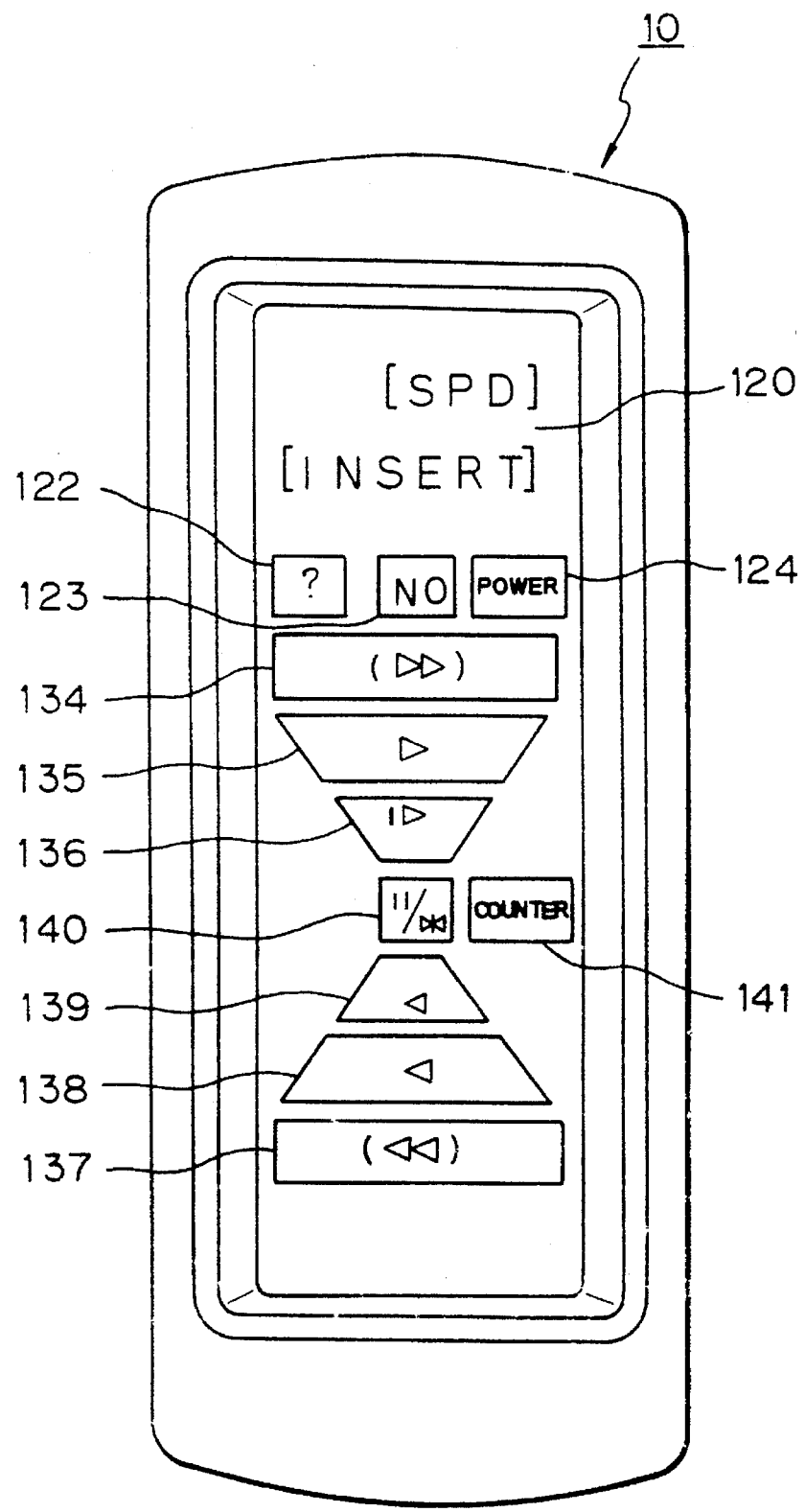

After the remote commander 10 is entered into the playback state in the [MONITOR] mode 102 and the pause mode is set, the remote commander 10 is entered into the [SHUTTLE] mode 103, as shown in FIG. 9. FIG. 10C is a pictorial representation of the key assignment in the [SHUTTLE] mode 103. In the [SHUTTLE] mode 103, after the message "SHUTTLE" scrolls on the character indicating portion 120, characters as shown in the figure are indicated. In the [SHUTTLE] mode 103, as shown in FIG. 10C, the character indicating portion 120 indicates the "?" key 122, the "NO" key 123, and the "POWER" key 124. Moreover, the character indicating portion 120 indicates forward variable speed playback keys 134, 135, and 136, reverse variable speed playback keys 137, 138, and 139, and a still picture playback key 140. Furthermore, the character indicating portion 120 indicates a "COUNTER" key 141. When the VTR main unit 1 is entered into the [SHUTTLE] mode 103, the variable speed playback operations with speeds of $\times \frac{1}{10}$, $\times \frac{1}{5}$, $\times 1$, and $\times 2$, as well as the playback direction, can be selected.

Figure 10D:
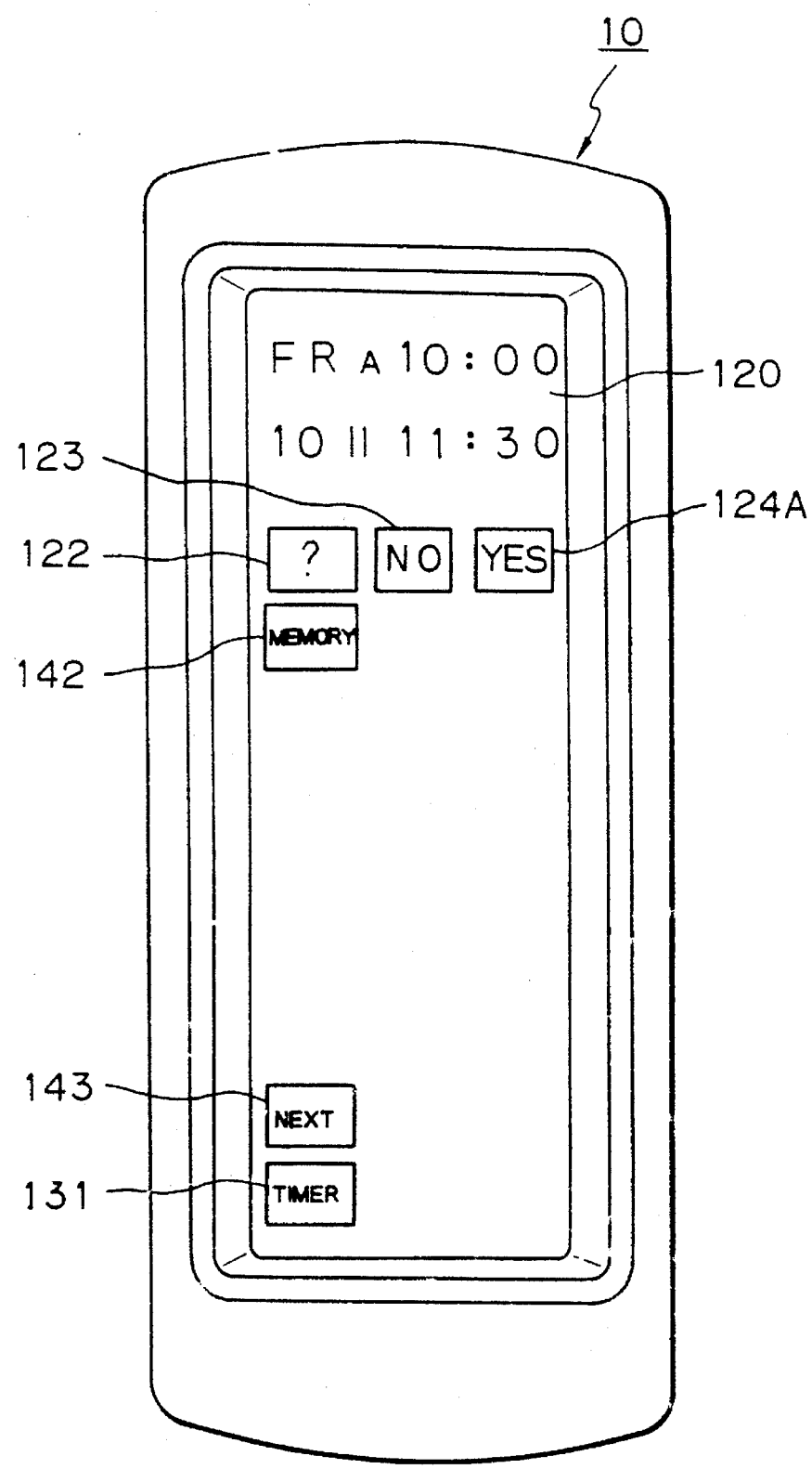

As shown in FIG. 9, when the VTR main unit 1 is in the timer reservation standby state "TIMER", the remote commander 10 is entered into the [TIMER CHECK] mode 104. FIG. 10D is a pictorial representation of the key assignments in the [TIMER CHECK] mode 104. In the [TIMER CHECK] mode 104, after two lines of a message "TIMER CHECK" (not shown) scroll on the character indicating portion 120, indications of the timer set state as shown in FIG. 10D appear. When two lines of message scroll on the character indicating portion 120, the upper message portion is followed by the lower message portion. In the [TIMER CHECK] mode 104, as shown in FIG. 10D, the character indicating portion 120 indicates the "?" key 122, the "NO"

key 123, and the "YES" key 124A (in the same position as the "POWER" key 124). Moreover, the character indicating portion 120 indicates a "MEMORY" key 142, a "NEXT" key 143, and a "TIMER" key 131. In the "TIMER CHECK" mode 104, whenever the "NEXT" key 143 is pressed, the reservation information for up to eight programs are indicated one after the other.

Figure 10E:
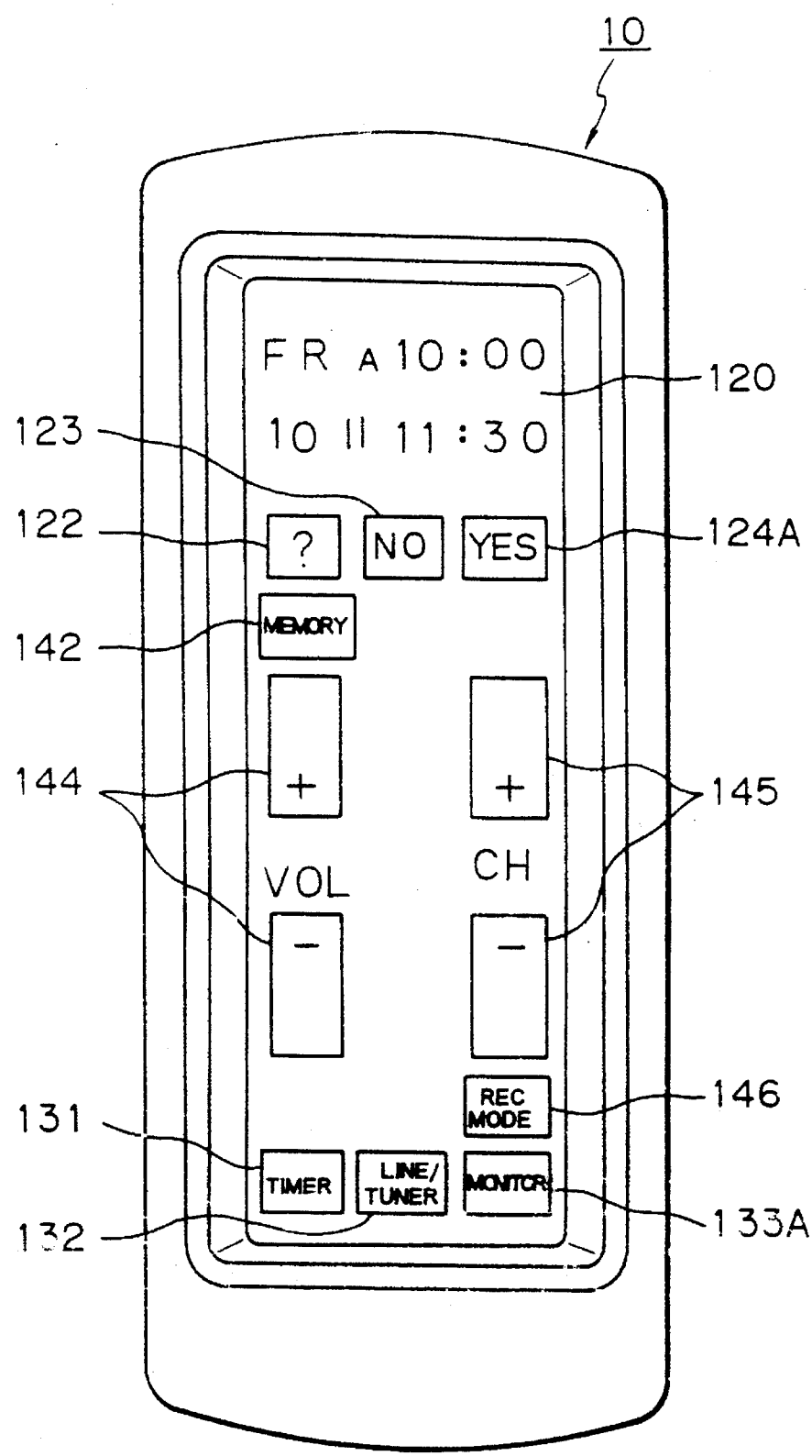

In FIG. 9, when the "TIMER" key 131 is pressed in the [TIMER CHECK] mode 104, the remote commander 10 is entered into the [TIMER SET] mode 105. FIG. 10E is a schematic diagram showing the key assignment in the [TIMER CHECK] mode 104. In the [TIMER SET] mode 105, after two lines of message "TIMER SET" scroll on the character indicating portion 120, indications of a timer set state as shown in FIG. 10E appear. In addition, the character indicating portion 120 indicates "?" key 122, the "NO" key 123, and the "YES" key 124A. The character indicating portion 120 also indicates up/down keys 144 and channel up/down keys 145, as well as the memory key 142, and the "REC MODE" key. In addition, the character indicating portion 120 indicates the "TIMER" key 131, the "LINE/TUNER" key 132, and the "MONITOR" key 133A in the same position as the "SETTING key 133 in FIG. 10B. When the "TIMER" key 131 is pressed in the [TIMER SET] mode 105, the remote commander 10 is entered back into the [TIMER CHECK] mode 104.

Figure 10F:
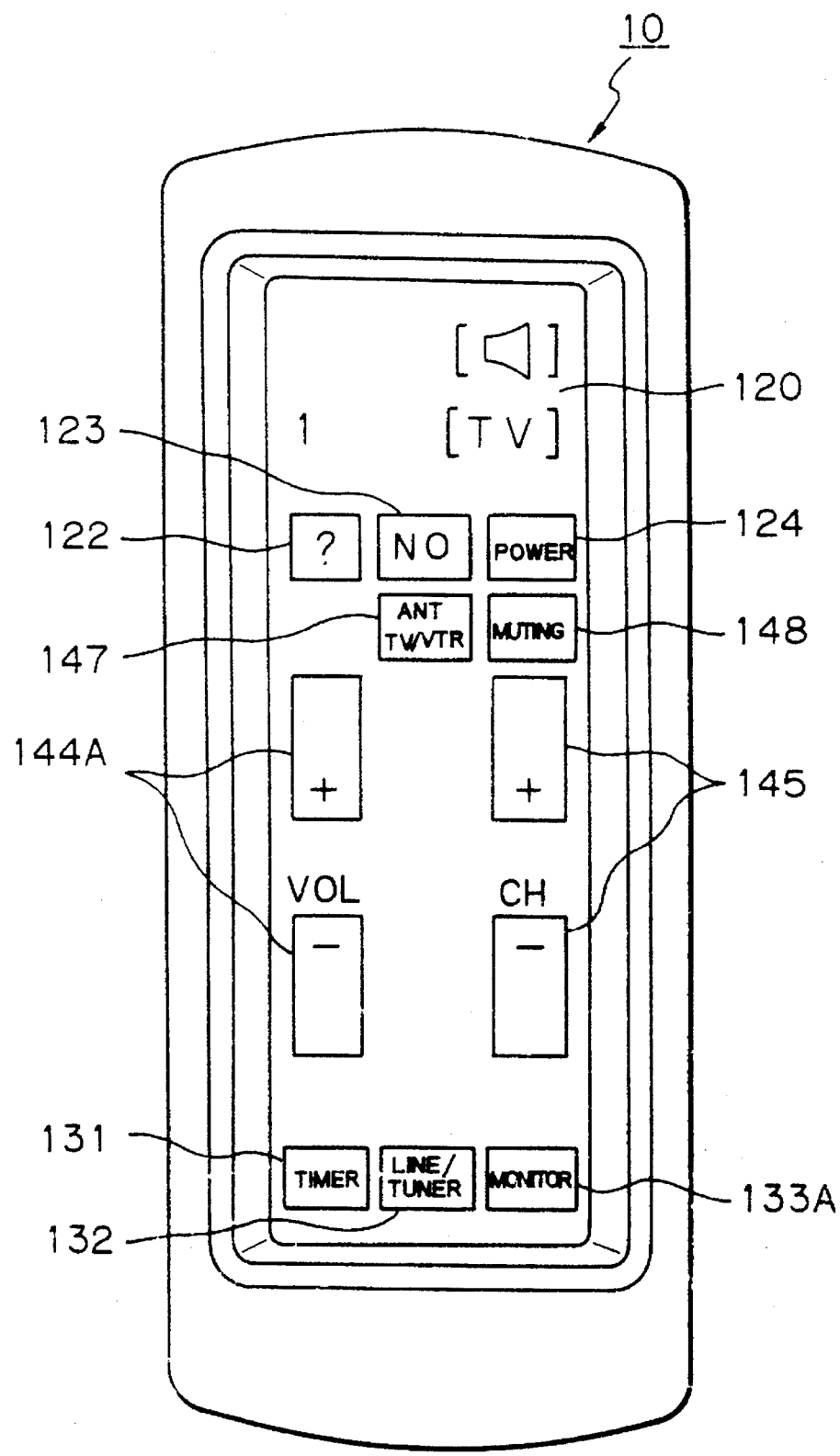

When the "LINE/TUNER" key 132 is pressed and the tuner input has been selected in the VTR main unit 1, the remote commander 10 is entered into the [TUNER MODE] 106 shown in FIG. 9. FIG. 10F is a pictorial representation showing the key assignment in the [TUNER MODE] 106. In the [TUNER MODE] 106, after a message "TUNER MODE" scrolls on the character indicating portion 120, characters as shown in the figure are indicated. In addition, the character indicating portion 120 indicates the "?" key 122, the "NO" key 123, and the "POWER" key 124, as well as a "ANT TV?VTR" key 147, and a "MUTING" key 148. Furthermore, the character indicating portion 120 indicates volume up/down keys 144A, channel up/down keys 145, the "TIMER" key 131, the "LINE/TUNER" key 132, and the "MONITOR" key 133A.

Figure 10G:
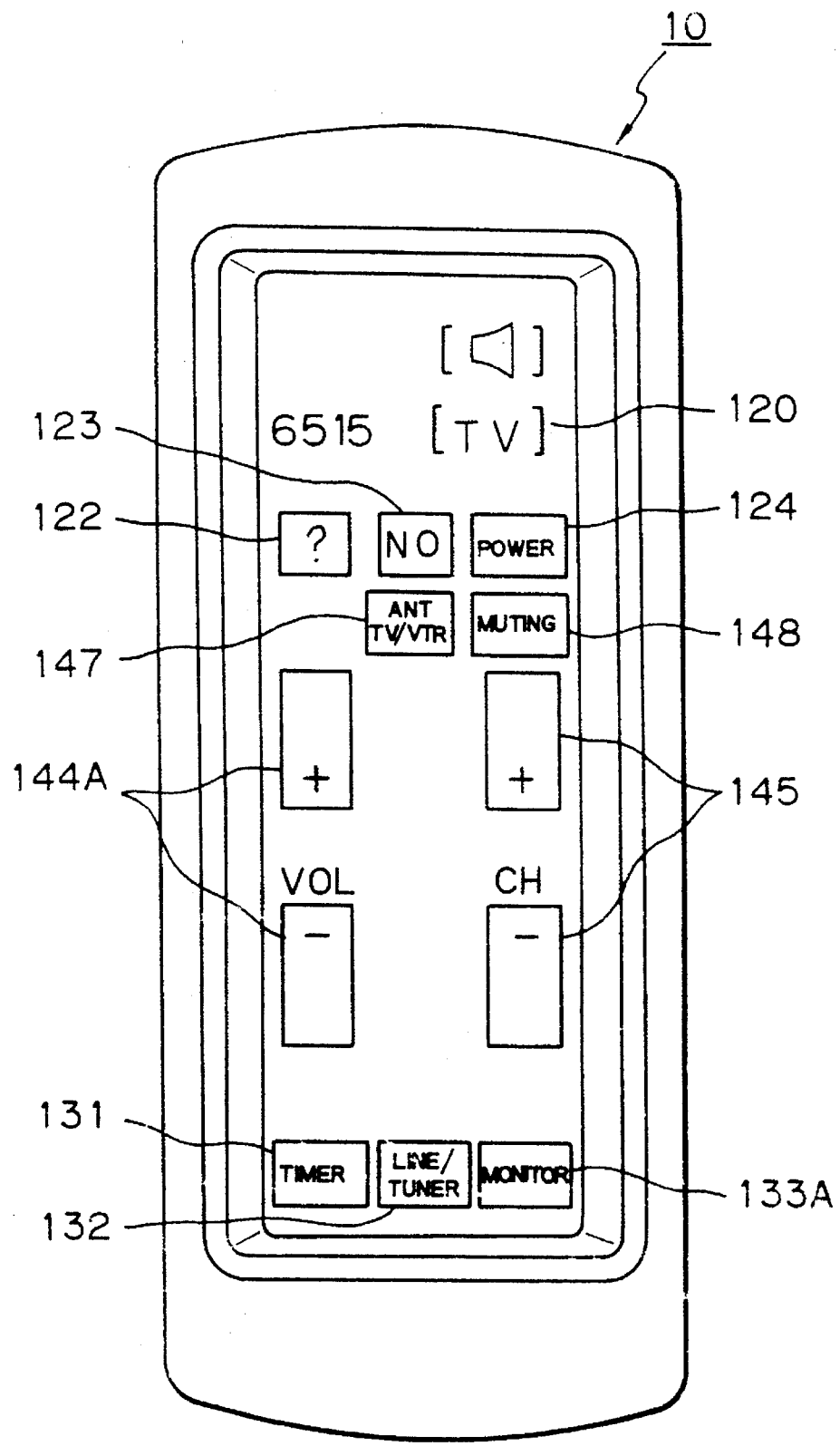

When the "LINE/TUNER" key 132 is pressed, if the BS (broadcast satellite) input has been selected in the VTR main unit 1, the remote commander 10 is entered into the [TUNER/BS] mode 107, as shown in FIG. 9. FIG. 10G is a pictorial representation showing the key assignment in the [TUNER/BS ] mode 107. In the [TUNER/BS ] mode 107, after a message "BS TUNER" scrolls on the character indicating portion 120, characters shown in FIG. 10G are indicated. In addition, the character indicating portion 120 indicates the "?" key 122, the "NO" key 123, and the "POWER" key 124, as well as an "ANT TV/VTR" key 147, and a "MUTING" key 148. Furthermore, the character indicating portion 120 indicates the volume up/down keys 144A and the channel up/down keys 145. In addition, the character indicating portion 120 indicates the "TIMER" key 131, the "LINE/TUNER" key 132, and the "MONITOR" key 133A.

Figure 10H:
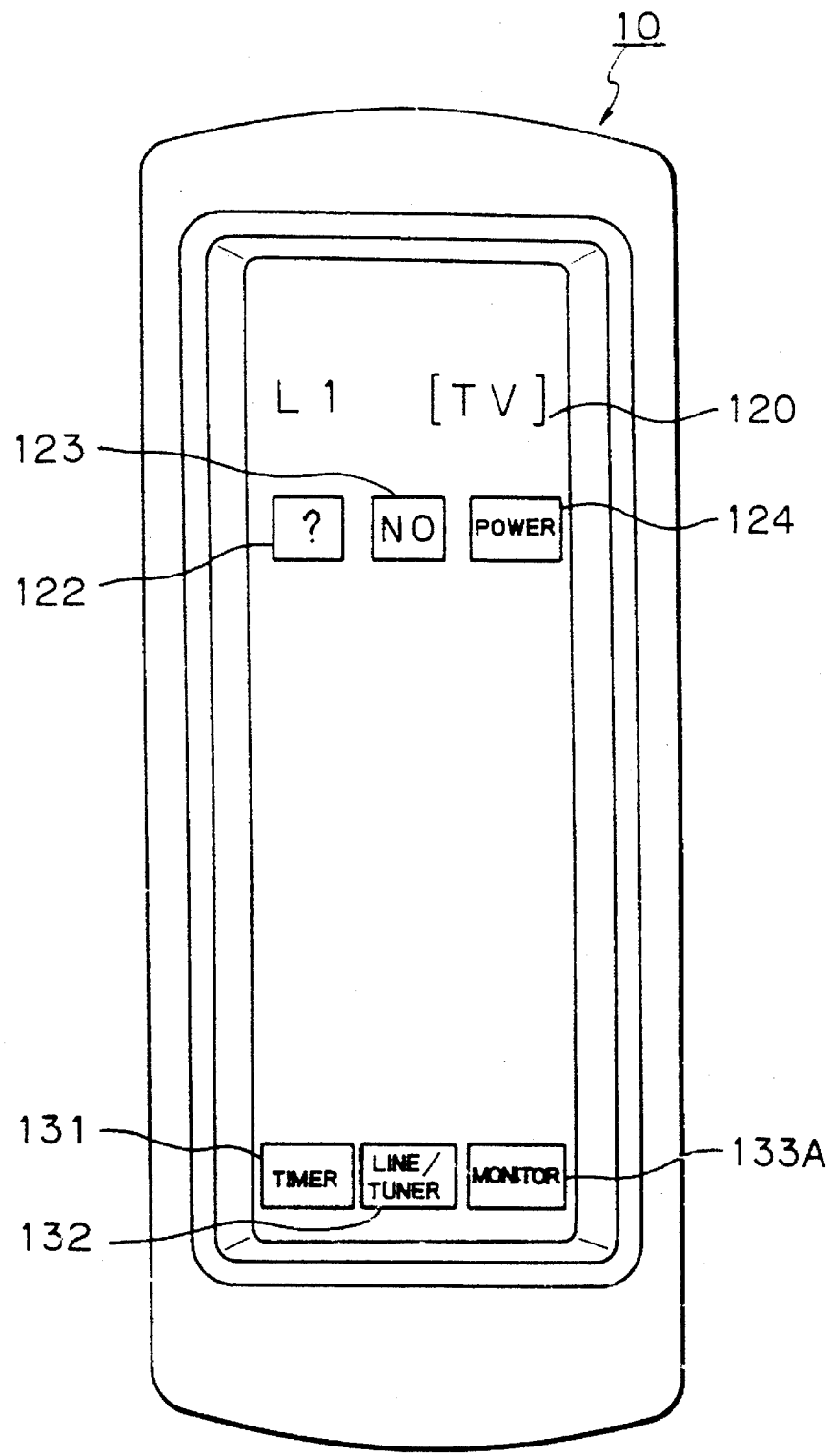

When the "LINE/TUNER" key 132 is pressed, if the line input 1 or 2 has been selected in the VTR main unit 1 the remote commander 10 is entered into the [LINE] mode 108, as shown in FIG. 9. FIG. 10H is a pictorial representation showing the key assignment in the [LINE] mode 108. In the [LINE] mode 108, characters shown in FIG. 10H are indicated on the character indicating portion 120. Specifically, the character indicating portion indicates the "?" key 122, the "NO" key 123, and the "POWER" key 124, as well as the "TIMER" key 131, the "LINE/TUNER" key 132, and the "MONITOR" key 133A.

In any state, when the "?" key 122 is pressed the lamp 44, shown in FIG. 6, lights up the display 31. In addition, a message representing the mode currently set will scroll on the character indicating portion 120. When the message consists of two lines, the first message portion is followed by the last message portion with a small delay. Thus, the mode can be readily checked. The lamp 44 is automatically extinguished after a predetermined time has elapsed. Thus, the user can at any time check the mode in which the remote commander 10 is then set by pressing the "?" key 122. At that time, since the lamp 44 lights up, as long as the user knows the position of the "?" key 122, he or she can conveniently operate the remote commander 10 even in the dark.

Figure 10I:
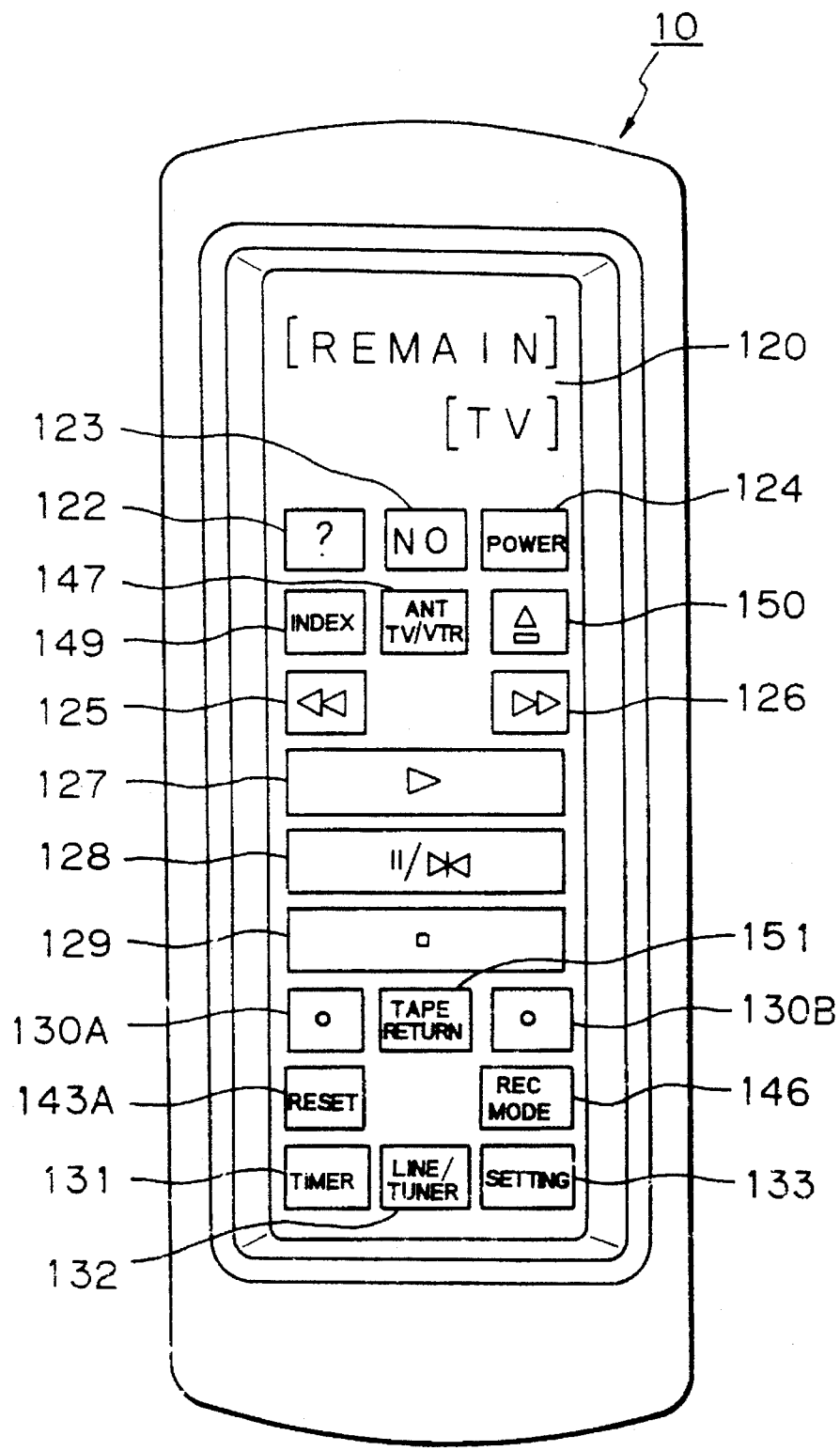

When the "?" key 122 is further pressed, the remote commander 10 is entered into the [HOME] mode 109. FIG. 10I is a pictorial representation showing the key assignment in the [HOME] mode 109. In the [HOME] mode 109, after the message "HOME" scrolls on the character indicating portion 120 characters as shown in FIG. 10I are indicated. More specifically, the character indicating portion 120 indicates the "?" key 122, the "NO" key 123, and the "POWER" key 124, as well as an "INDEX" key 149, the "ANT TV/VTR" key 147, and the eject key 150. Furthermore, the character indicating portion 120 indicates the rewind key 125, the fast forward key 126, the playback key 127, the pause key 128, the stop key 129, and the record keys 130A and 140B. In addition, the character indicating portion 120 indicates a "TAPE RETURN" key 151, a "COUNTER RESET" key 143A, and a "REC MODE" key 146, as well as the "TIMER" key 131, the "LINE/TUNER" key 132, and the "SETTING" key 133. In this [HOME] mode, all keys necessary for operating the VTR main unit 1 are provided.

Figure 10J:
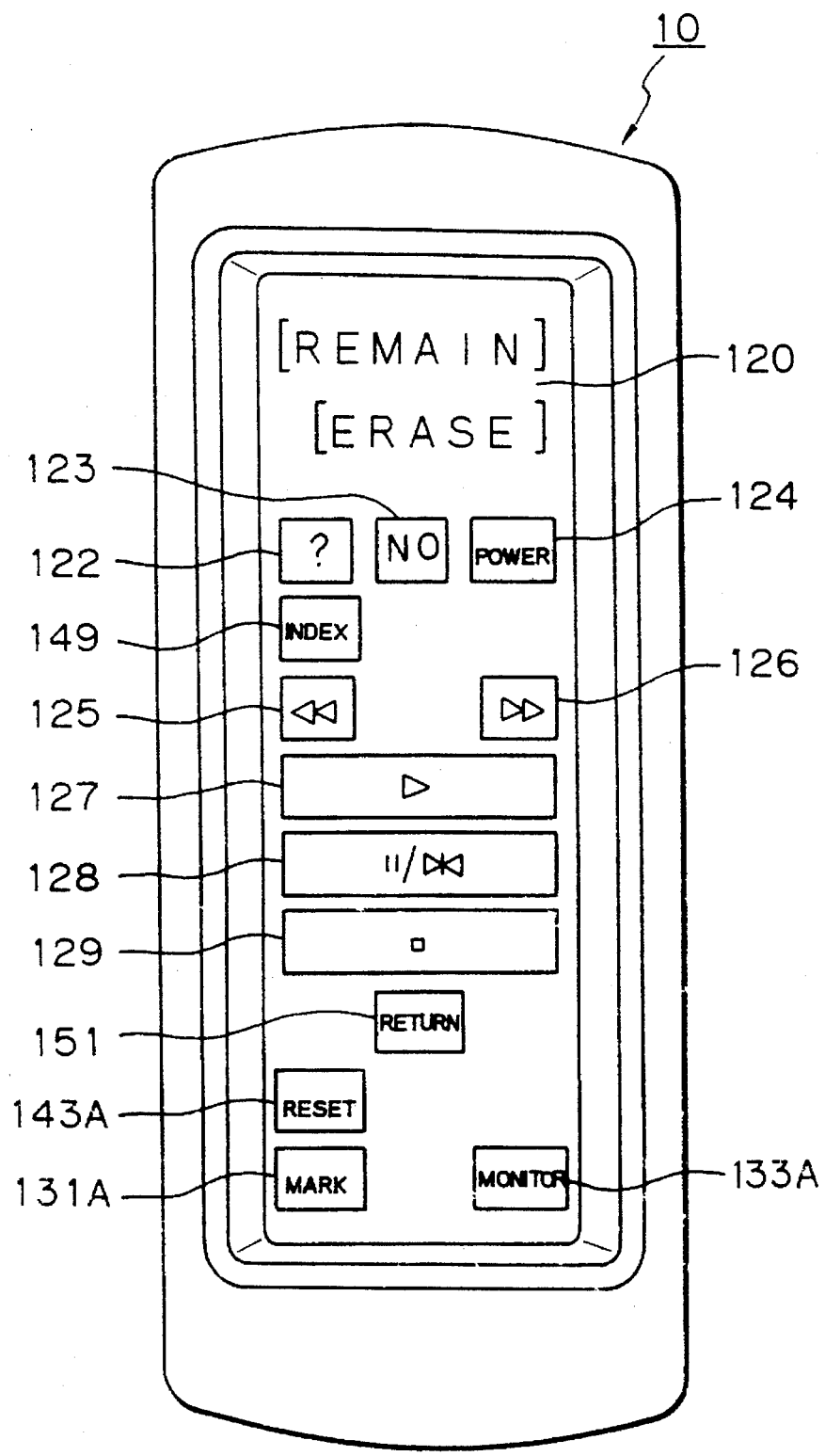

When the "INDEX" key 149 is pressed, the remote commander 10 is entered into the [INDEX COUNTER] mode 110, as shown in FIG. 9. FIG. 10J is a pictorial representation showing the key assignment in the [INDEX COUNTER] mode 110. In the [INDEX COUNTER] mode 110, characters as shown in FIG. 10J are indicated on the character indicating portion 120. More specifically, the character indicating portion 120 indicates the "?" key 12, the "NO" key 123, the "POWER" key 124, and the "INDEX" key 149. Furthermore, the character indicating portion 120 indicates the rewind key 125, the fast forward key 126, the playback key 127, the pause key 128, and the stop key 129, as well as the "TAPE RETURN" key 151 and the "COUNTER RESET" key 143A. In addition, the character indicating portion 120 indicates an "INDEX MARK" key 131A and the "MONITOR" key 133A.

Figure 10K:
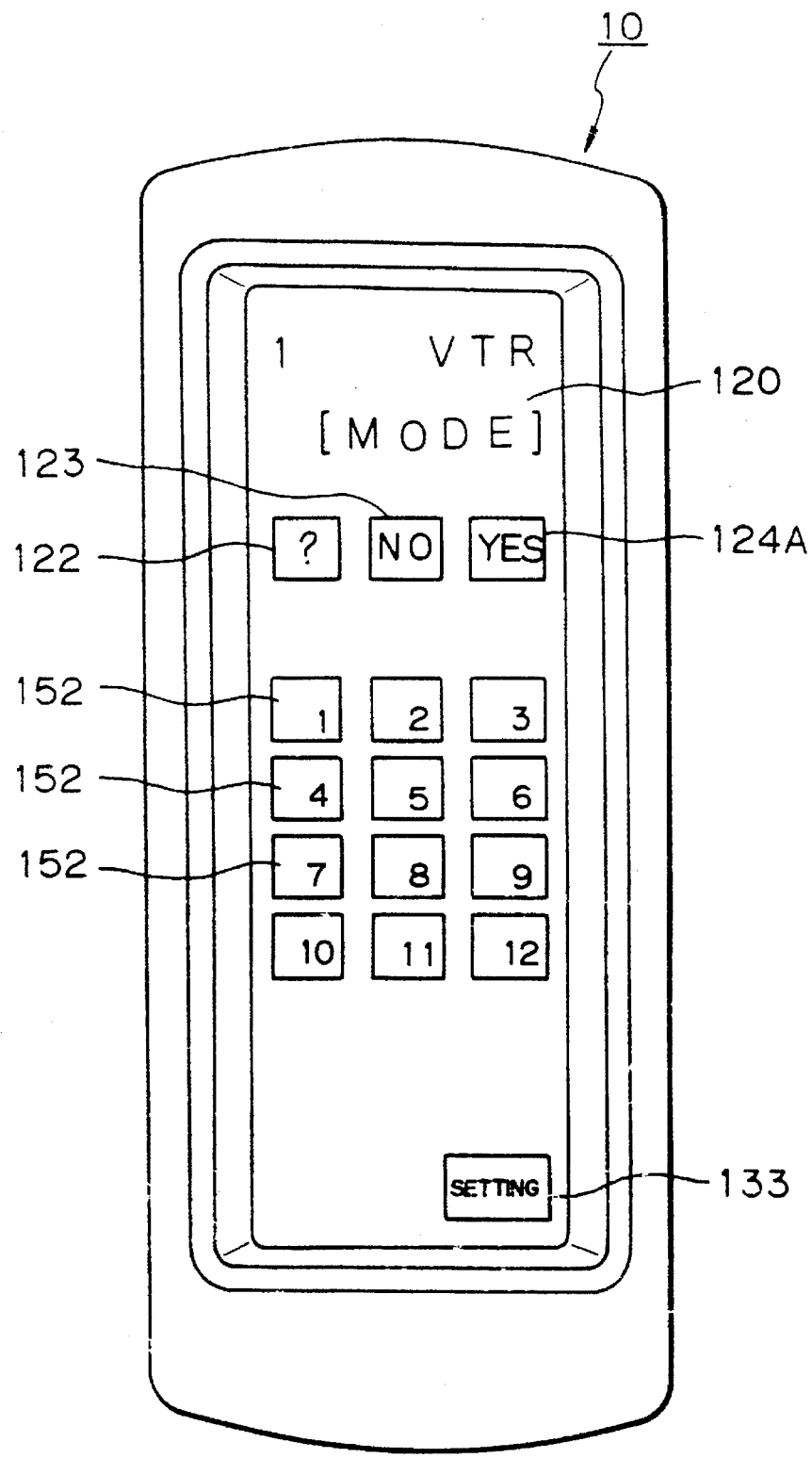

When the "SETTING" key 133 is pressed, the remote commander 10 is entered into the [COMMAND] mode 111, as shown in FIG. 9. FIG. 10K is a pictorial representation showing the key assignment in the [COMMAND] mode 111. In the [COMMAND] mode 111, two lines of a message "COMMAND MODE" scroll on the character indicating portion 120, and the character indicating portion 120 indicates the "?" key 122, the "NO" key 123, and the "YES" key 124A. Moreover, the character indicating portion 120 indicates twelve keys assigned to numbers "1" to "12", shown typically at 152. Furthermore, the character indicating portion 120 indicates the "SETTING" key 133. By using the keys "1" to "12", the remote commander 10 can be selected. The numerals "1" to "12" assigned to the keys 152 are in accordance with codes identifying the various makers of the devices.

Figure 10L:
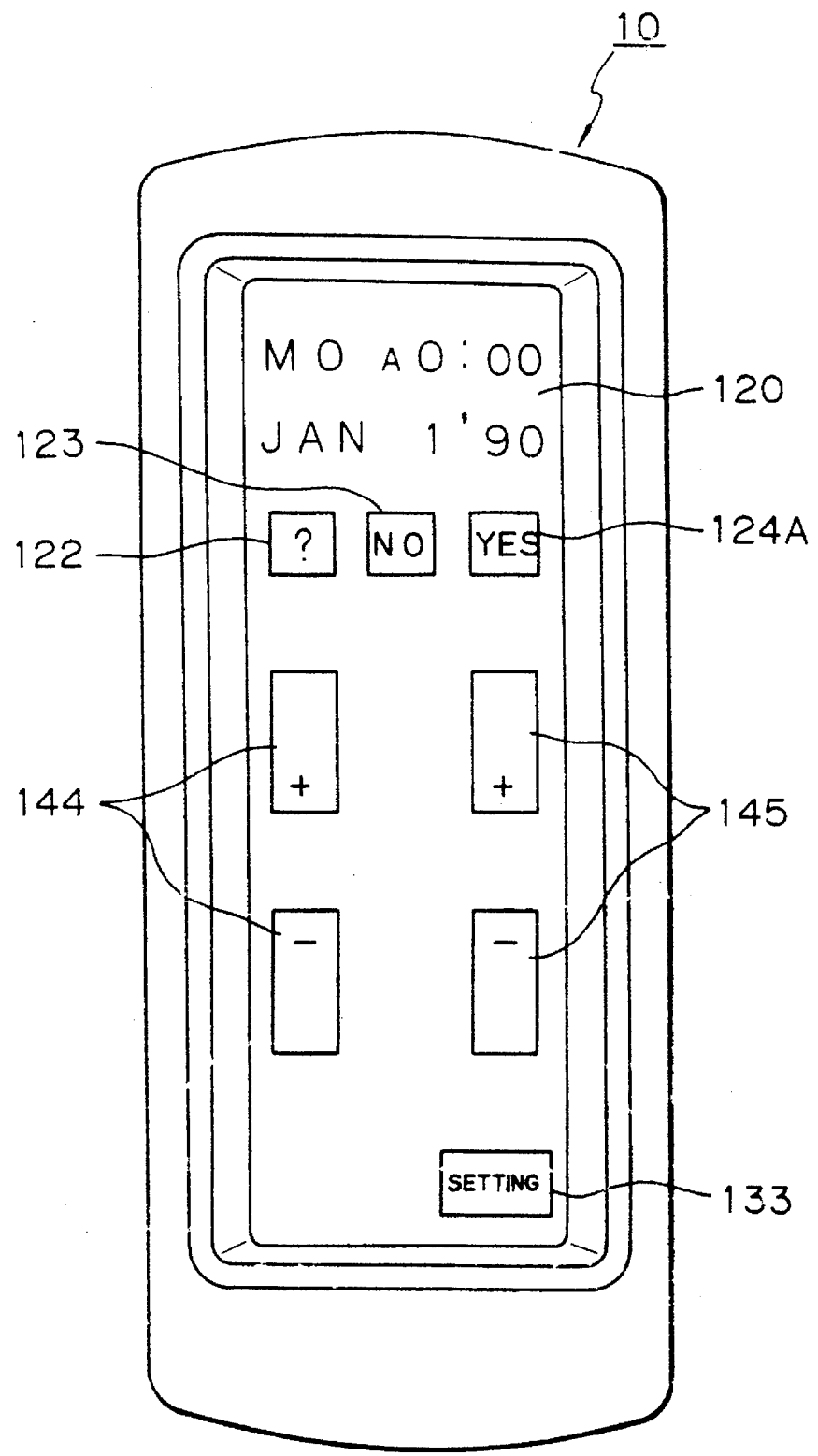

When the "SETTING" key 133 is further pressured, the remote commander 10 is entered into the [CLOCK SET] mode 112, as shown in FIG. 9. FIG. 10L is a pictorial representation showing the key assignment in the [CLOCK SET] mode 112. In the [CLOCK SET] mode 112, after a message "CLOCK SET" scrolls on the character indicating portion 120, characters for setting the calendar and time as shown in FIG. 10L are indicated. More specifically, the character indicating portion 120 indicates the "?" key 122, the "NO" key 123, and the "YES" key 124A, as well as the up/down keys 144, and the channel up/down keys 145. Furthermore, the character indicating portion 120 indicates the "SETTING" key 133. In the [CLOCK SET] mode 112, with the characters indicated on the character indicating portion 120 and the up/down keys 144, the calendar and time of the timer circuit 17 of the VTR main unit 1 (shown in FIG. 2) can be correctly set.

Figure 10M:
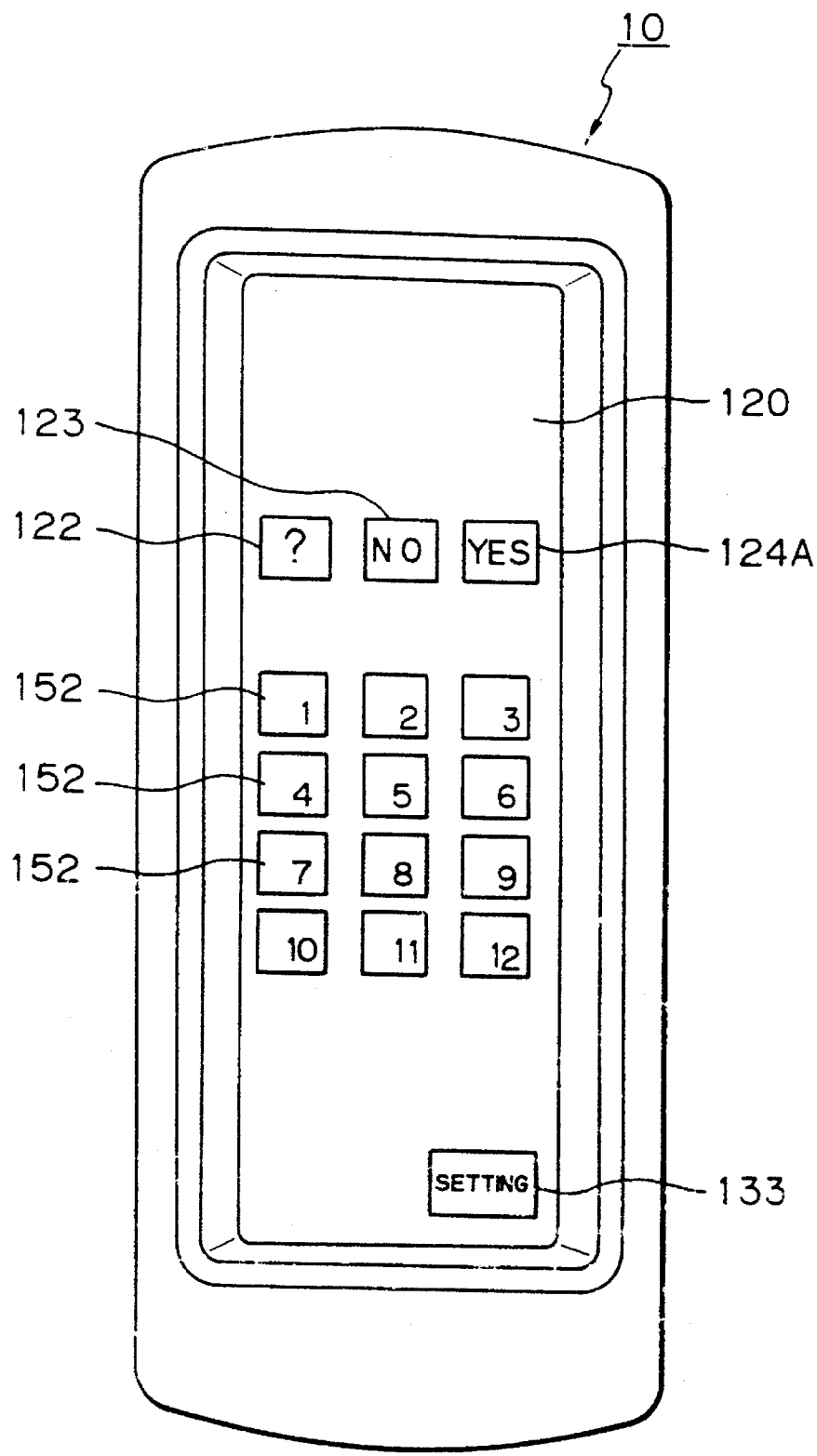

When the "SETTING" key 133 is pressed, the remote commander 10 is entered into the [TUNER RESET] mode 113, as shown in FIG. 9. FIG. 10M is a pictorial representation showing the key assignment in the [TUNER PRESET] mode 113. In the [TUNER PRESET] 113 mode, after a message "TUNER PRESET" scrolls on the character indicating portion 120, characters as shown in FIG. 10M are indicated. More specifically, the character indicating portion 120 indicates the "?" key 122, the "NO" key 123, and the "YES" key 124A, as well as the keys 152, assigned to numerals "1" to "12". Moreover, the character indicating portion 120 indicates the "SETTING" key 133. In the [TUNER PRESET] mode 113, a reception channel of the tuner can be set.

When the "SETTING" key 133 is further pressed, the remote commander 10 is entered into the [COMMAND] mode 111, as shown in FIG. 9.

k. Basic operation method of remote commander

As shown in FIGS. 10A to 10M, in the remote commander 10, the key assignment is changed depending on each mode. The "?" key 122 has a help function that can be used when the user forgets the present operational setting of the remote commander 10. In other words, when the user wants to know in what mode the remote commander 10 has been set, he or she presses the "?" key 122. Thereafter, characters of the mode which has been set scroll on the character indicating portion 120. In addition, when the "?" key 122 is pressed the lamp 44 lights up the display 31 and the touch panel 32. Thus, even in a dark place, the setting state of the remote commander 10 can be checked.

When the characters that are indicated on the character indicating portion 120 consist of two lines, the two lines scroll sequentially with a small time delay between lines. Thus, the visibility of the character indication consisting of two lines is improved.

When the user does not know the setting mode and its operation, he or she continuously presses the "?" key 122 for several seconds. In this state, the remote commander 10 is entered into the [HOME] mode 109. In the [HOME] mode 109, as shown in FIG. 10I, all the keys necessary for the normal operations are indicated. Thus, any operation can be performed.

The "NO" key 123 is used to cancel the entry just made and restore the system to the immediately preceding state. When an incorrect key is pressed or when the remote commander 10 is incorrectly set, the user presses the "NO" key 123. At that time, the remote commander 10 is restored to the preceding state before the undesired entry was made. In most remote commanders with multiple functions, when an incorrect key is pressed the preceding set mode may not be restored, however, in this remote commander 10, when the "NO" key 123 is pressed, the key entry just made is cancelled and the remote commander 10 is restored to the preceding state. When the "NO" key 123 is pressed twice, the remote commander 10 is entered into the [HOME] mode 109 where all keys necessary for the normal operations are indicated.

Characters of the time and calendar and those in brackets that are indicated in the indicating portion 120 can be directly pressed so as to set various operations. Thus, the operability of the remote commander 10 is improved.

l. Processing when the time has not been set

In the embodiment of the present invention, when the remote commander 10 is entered into the [TIMER SET] mode 105, shown in FIG. 10E, a timer record can be set. In this construction, however, the timer record may not be correctly set because the calendar and time have not been correctly set in the timer circuit 17 of the VTR main unit 1. To prevent this situation, in the embodiment according to the present invention if the calendar and time have not been set in the timer circuit 17 when the power is turned on or if the timer record or quick timer record is attempted when they have not been properly set, a message "PLEASE SET THE CLOCK" is indicated on the display 5 so as to inform the user that the calendar and time have not been set.

Moreover, in the embodiment according to the present invention, the remote commander 10 detects whether it is equipped with a battery. After the battery is newly mounted, when the "TIMER" key 131 is pressed so as to perform the timer record the remote commander 10 is entered into the [CLOCK SET] mode 112. When the calendar and time have not been set, the remote commander 10 is prohibited from performing the timer record. The battery mount detection circuit 45 shown in FIG. 6, detects whether the remote commander 10 has the battery installed therein. Since the remote commander 10 is entered into the [CLOCK SET] mode 112, shown in FIG. 10L, before the timer record is performed, the calendar and timer are correctly set in the timer circuit 17 of the VTR main unit 1, thereby preventing the situation that the clock and calendar are incorrectly set.

m. Setting of calendar and time

In the [CLOCK SET] mode 112, shown in FIG. 10L, the calendar and time are set in the following manner. When the remote commander 10 is entered into the [CLOCK SET] model 112, as shown in FIGS. 11A–11D, a day-of-the-week indication 161, an hour indication 162, a minute indication 163, a month indication 164, a day indication 165, and a year indication 166 are indicated.

When one of indications on the character indicating portion 120 is directly pressed so as to set it, the pressed indication blinks, as shown in FIGS. 11A–11D. When the up/down keys 144 are pressed, the indication that blinks can be set.

Figure 11A:
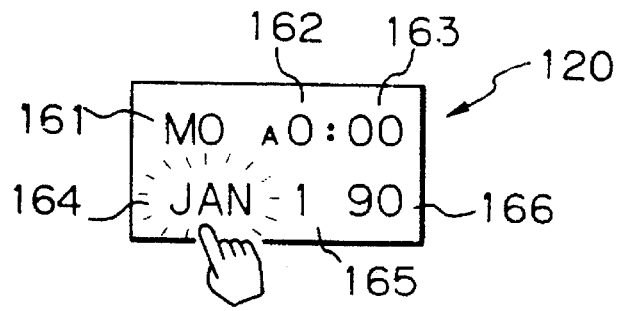
FIGS. 11A to 11F are pictorial representations showing the setting of the calendar and the current time.

For example, when the month indication 164 is pressed, as shown in FIG. 11A, the month indication 164 blinks. Thereafter, when the up/down keys 144 are pressed, the month indication 164 increments or decrements, so that the desired month can be set.

Figure 11B:
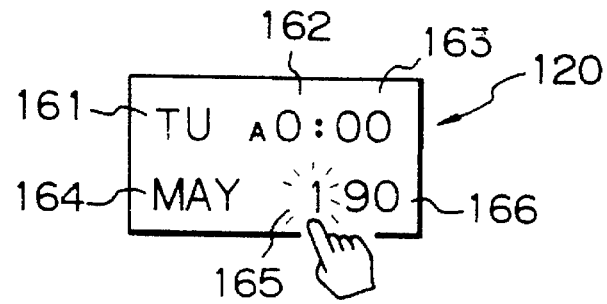

When the day indication 165 is pressed, as shown in FIG. 11B, the day indication 165 blinks. Thereafter, when the up/down keys 144 are pressed, the day indication 165 increments or decrements, so that the desired day can be set.

Figure 11C:
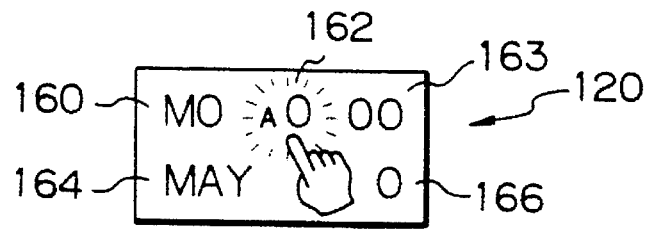

When the time indication 162 is pressed, as shown in FIG. 11C, the time indication 162 blinks. Thereafter, when the up/down keys 144 are pressed, the time indication 162 increments or decrements, so that the desired time can be set.

Figure 11D:
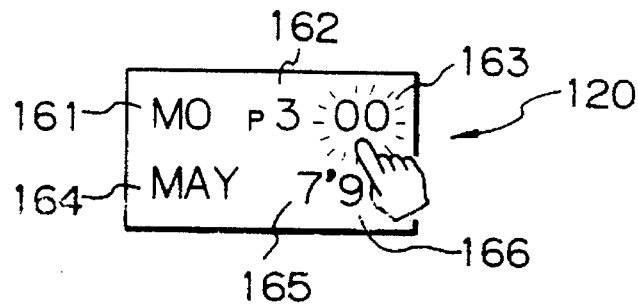

When the minute indication 163 is pressed, as shown in FIG. 11D, the minute indication 163 blinks. Thereafter, when the up/down keys 144 are pressed, the minute indication 163 increments or decrements, so that the desired minute can be set.

Thus, when one of the indications on the character indicating portion 120 is directly pressed, the indication blinks. Thereafter, when the up/down keys 144 are pressed, the indication increments or decrements, so that the desired value can be set. If a value is incorrectly set, then the "NO" key 123 is pressed, and the remote commander 10 is restored to the preceding state. When the "NO" key 123 is pressed twice, the remote commander 10 is entered into the [HOME] mode 109.

Figure 11E:

After the indications are checked, then the "YES" key 124A is pressed and, as shown in FIG. 11E, a message "TRANSMIT" 167 is indicated on the character indicating portion 120.

Figure 11F:
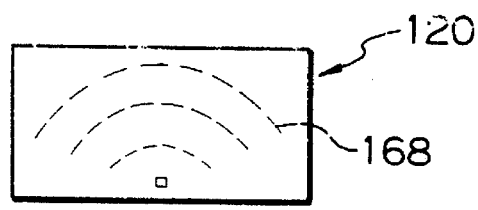

When the "YES" key 124A is pressed a time tone takes place, and a command signal is transmitted to the VTR main unit 1. In addition, a transmission message indication 168, as shown in FIG. 11F, is indicated on the character indicating portion 120 and then the calendar and time are set in the timer circuit 17 of the VTR main unit When the remote commander 10 is entered into the [TIMER SET] mode 105, as shown in FIG. 10E, the timer record can be performed in the following manner.

When the remote commander 10 is entered into the [TIMER SET] mode 105, a day-of-the-week indication 171, a record start hour indication 172, a record start minute indication 173, a channel indication 174, a record mode indication 175, a record end hour indication 176, and a record end minute indication 177 are indicated, as shown in FIGS. 12A–12F.

When one of indications on the character indicating portion 120 is directly pressed, that indication blinks. Thereafter, when the up/down keys 144 are pressed, the indication increments or decrements, so that the desired value can be set.

Figure 12A:
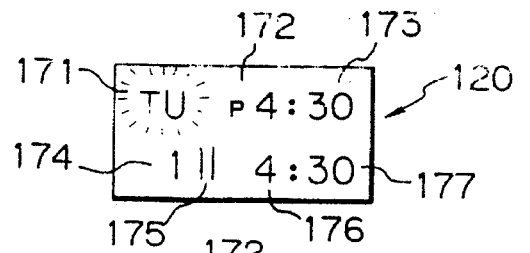
FIGS. 12A to 12H are pictorial representations showing the setting of a timer.

For example, when the day-of-the-week indication 171 is pressed, as shown in FIG. 12A, the indication blinks. Thereafter, when the up/down keys 144 are pressed, the day-of-the-week indication 171 increments or decrements, so that the desired day of the week can be set.

Figure 12B:
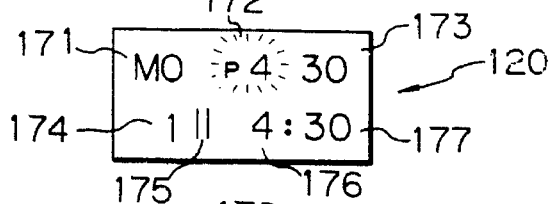

When the record start hour indication 172 is pressed, as shown in FIG. 12B, the indication blinks. Thereafter, when the up/down keys 144 are pressed, the record start hour indication 172 increments or decrements, so that the desired record start hour can be set.

Figure 12C:
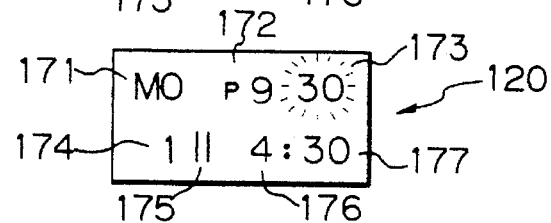

When the record start minute indication 173 is pressed, as shown in FIG. 12C, the indication blinks. Thereafter, when the up/down keys 144 are pressed the record start minute indication 173 increments or decrements, so that the desired record start minute can be set.

Figure 12D:
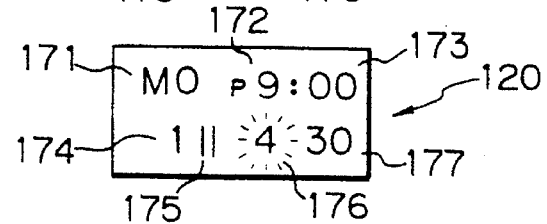

When the record end hour indication 176 is pressed, as shown in FIG. 12D, the indication blinks. Thereafter, when the up/down keys 144 are pressed, the record end hour indication 176 increments or decrements, so that the desired record end hour can be set.

Figure 12E:
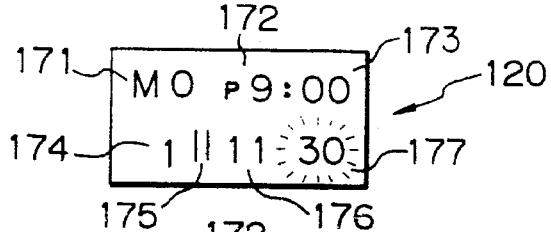

When the record end minute indication 177 is pressed, as shown in FIG. 12E, the indication blinks. Thereafter, when the up/down keys 144 are pressed, the record end minute indication 177 increments or decrements, so that the desired record end minute can be set.

Figure 12F:
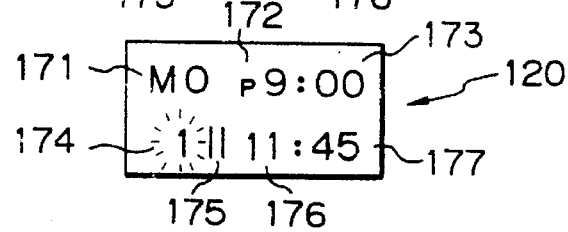

When the channel indication 174 is pressed, as shown in FIG. 12F, the indication blinks. Thereafter, when the channel set keys 145 are pressed the channel indication 174 increments or decrements, so that the desired channel can be set.

Figure 12G:
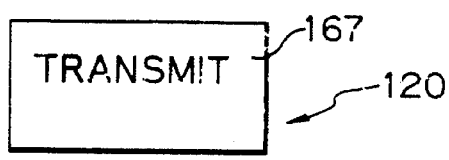

After the channel is set, when the "YES" key 124A is pressed, as shown in FIG. 12G, the message "TRANSMIT" 167 is indicated on the character indicating portion 120.

Figure 12H:
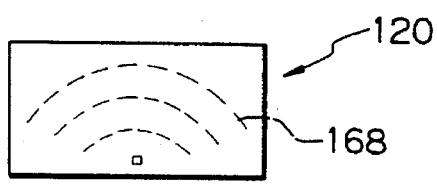

When the "YES" key 124A is pressed within, for example, five minutes, the command signal is transmitted to the VTR main unit 1. In addition, the transmission message indication 168, as shown in FIG. 12H, is indicated on the character indicating portion 120 and then the timer set is performed to the timer memory 18 of the VTR main unit 1.

Figure 13A:
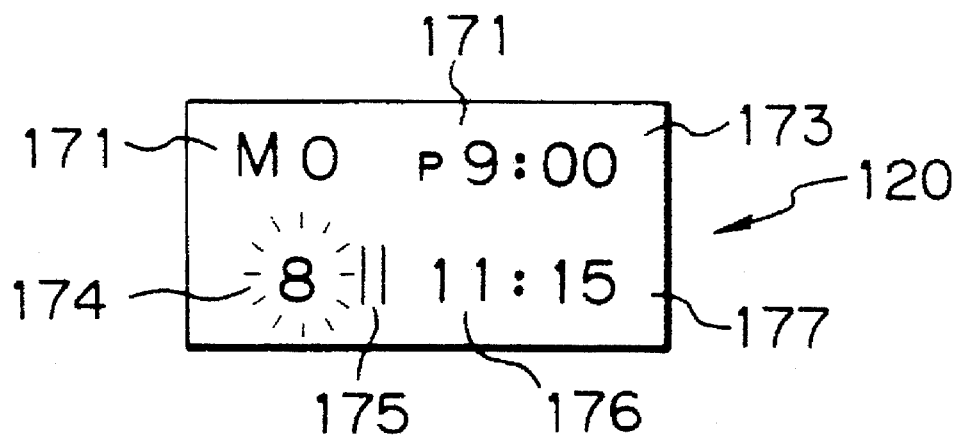
FIGS. 13A and 13B are pictorial representations showing the record mode.
Figure 13B:
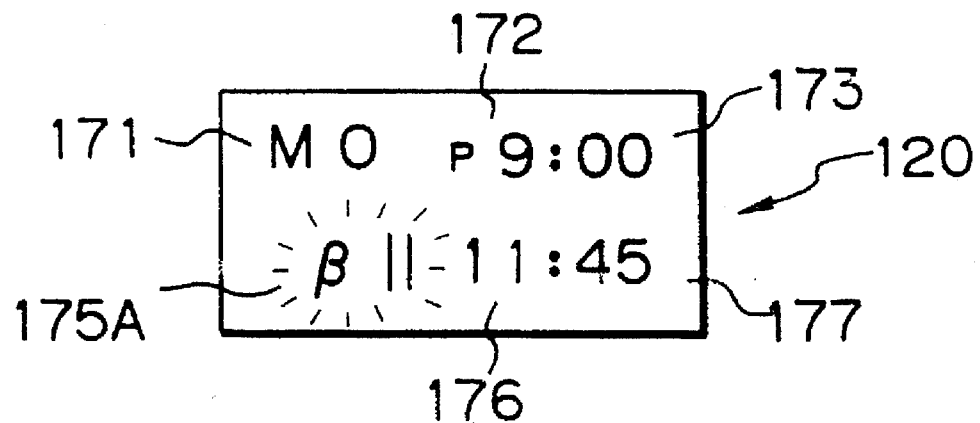

In the record mode, normally the Beta II mode is set, however, other record modes are set in the following manner. As shown in FIG. 13A, when the channel indication 174 is pressed the indication blinks. Thereafter, when the "REC MODE" key 146 is pressed, as shown in FIG. 13B, the channel indication 174 disappears. Instead, a detail record mode indication 175A with a character of Beta is indicated. Whenever the "REC MODE" key 146 is pressed, the record mode indication 175A sequences through Beta III, Beta I, . . . , and so forth, so that the desired record mode can be set.

Since the record mode is normally set to the Beta II mode, the record mode indication 175 omits the character of Beta so as to simplify the indication and to fully use the indication area. When a record mode is set, the detail record mode indication 175A with the character of Beta appears, so that the user can accurately set the desired record mode.

If an incorrect record mode is set, then the "NO" key 123 is pressed and the remote commander 10 is restored to the preceding state. When the "NO" key 123 is pressed twice, the remote commander 10 is entered into the [HOME] mode 109.

Figure 14:
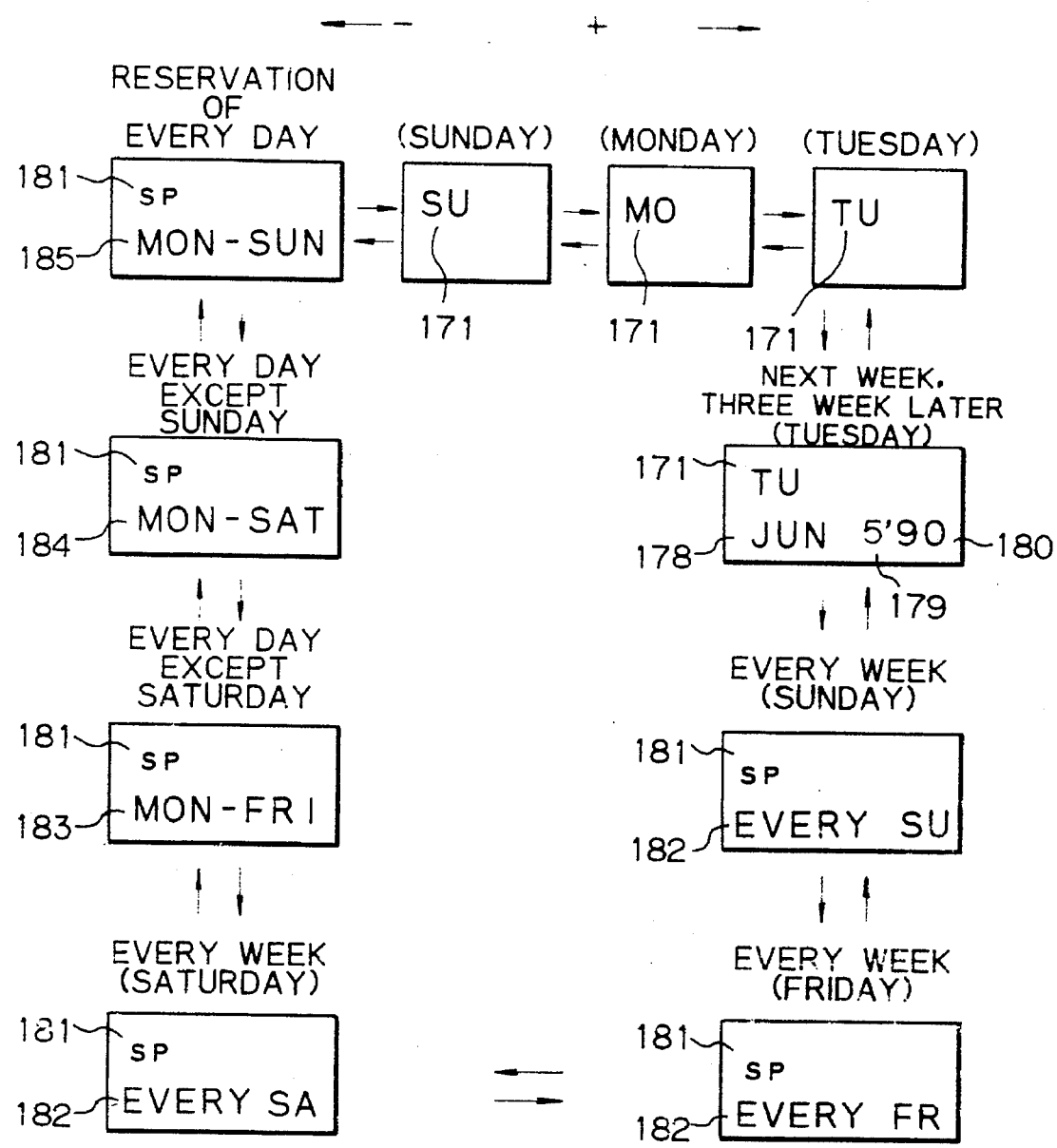
FIG. 14 is a pictorial representation showing the procession followed in setting the day of the week.

When the up key of the up/down keys 144 is continuously pressed so as to set a desired day of the week, as shown in FIG. 14, a record set, an every-week record set, and so forth for up to one month can be performed. When the up key is continuously pressed, the day-of-the-week indication 171 sequences through in the order to "SU", "MON", . . . , "SAT" one after the other. When only the day-of-the-week indication 172 is indicated, a timer record in that week is set. Thereafter, when the up key is continuously pressed, a month indication 178, a day indication 179, and a year indication 180 are indicated along with the day-of-the-week indication 171. Thus, timer records of the next week, two weeks later, . . . , and so forth can be set. In this manner, timer records can be set for up to one month. Thereafter, when the up key is continuously pressed, an "SP" indication 181 and "EVERY SU", "EVERY MON", . . . , "EVERY SAT" indications 182 are indicated. Thus, a timer record is performed at the same time on the same day of every week. Thereafter, when the up key is continuously pressed a "MON–FRI" indication 183 is indicated, so that a timer record of every day except for Saturday and Sunday is set. Thereafter, when the up key is continuously pressed a "MON–SAT" indication 184 is indicated and thereby a timer record of every day except for Sunday is set. Thereafter, when the up key is continuously pressed a "MON–SUN" indication 185 is indicated and thereby a timer record of every day of the week is set. Thereafter, when the up key is continuously pressed the remote commander 10 is restored to the day-of-the-week indication 171 of that week. In contrast, when the down key is continuously pressed the reverse operations as those made by the up key are performed.

o. Memory bank function

When the "MEMORY" key 142 is pressed while the message "TRANSMIT" 167 is indicated on the character indicating portion 120 in the timer record set mode, the remote commander 10 is entered into the memory bank mode for storing a program. At that time, the user can title the program, thereby improving the operability of the system.

Figure 15A:
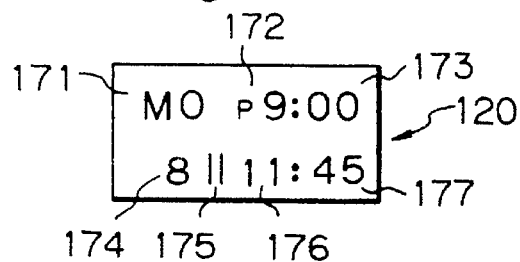
FIGS. 15A to 15I are pictorial representations showing the setting of a memory bank.
Figure 15B:
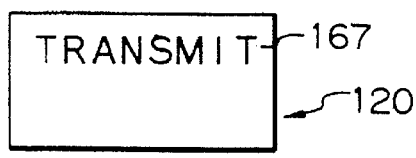
Figure 15C:
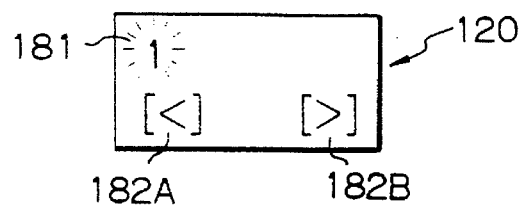
Figure 15D:
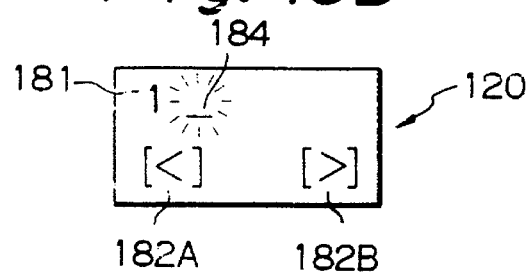
Figure 15E:
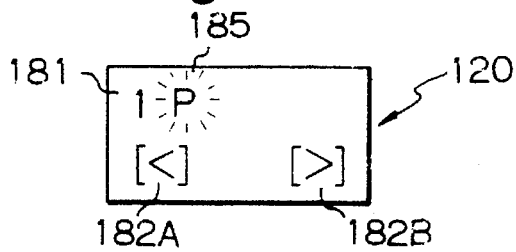
Figure 15F:
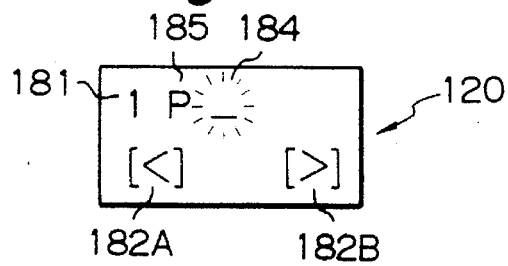
Figure 15G:
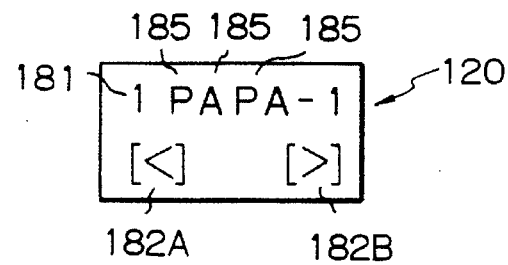

For example, when the timer record is set, as shown in FIG. 15A, a timer hour is set. Thereafter, when the "YES" key 124A is pressed, as shown in FIG. 15B, the message "TRANSMIT" 167 is indicated on the character indicating portion 120. When the "MEMORY" key 142 is pressed while the message "TRANSMIT" 167 is indicated on the character indicating portion 120, as shown in FIG. 15C, a reservation number indication 181, and character position set keys 182A and 182B are indicated on the character indicating portion 120. When the character position set keys 182A and 182B are pressed, as shown in FIG. 15D, a cursor 184 is accordingly moved. When the up/down keys 144 are operated, a character is indicated at the position where the cursor 184 blinks. When the cursor 184 is moved to a desired position with the character position set keys 182A and 182B and then the up/down keys 144 are operated, as shown in FIGS. 15E to 15G, title character indications, shown typically at 185 are formed.

Figure 15H:
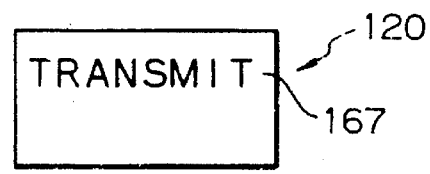
Figure 15I:
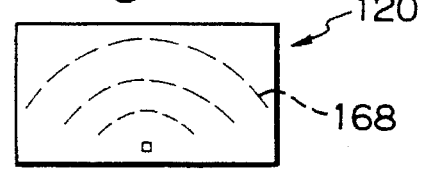

Thereafter, when the "YES" key 124A is pressed, as shown in FIG. 15H, the message "TRANSMIT" 167 is indicated on the character indicating portion 120. Then the "YES" key 124A is pressed, and a command signal is transmitted to the VTR main unit 1. In addition, the transmission message indication 167, as shown in FIG. 15I, is indicated on the character indicating portion 120.

p. Check and change of reserved contents

Figure 16A:
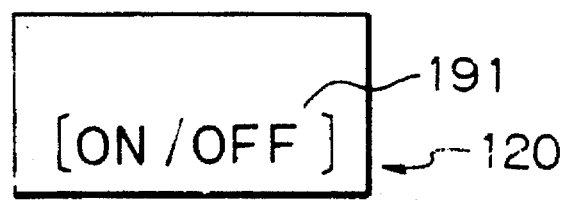
FIGS. 16A to 16D are pictorial representations showing the checking of reserved contents in the memory.
Figure 16B:
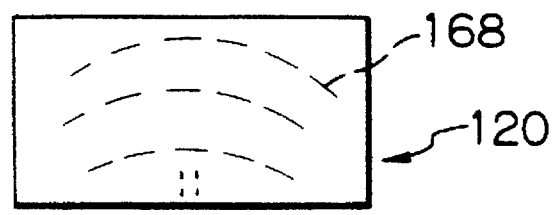
Figure 16C:
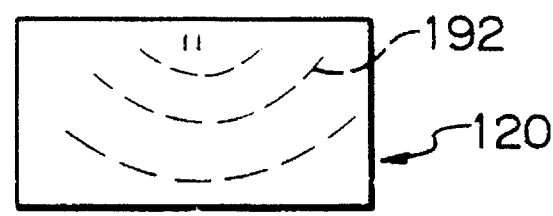
Figure 16D:
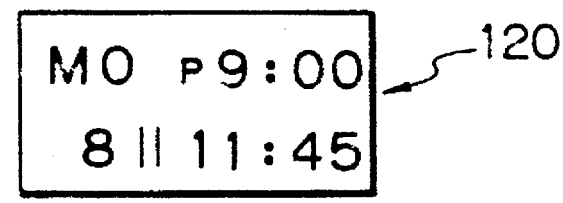

When the remote commander 10 is entered into the [TIMER CHECK] mode 104, the reserved contents can be checked. For example, when the remote commander 10 is entered into the [TIMER CHECK] mode 104, as shown in FIG. 16A, an [ON/OFF] indication 191 is indicated on the character indicating portion 120. When the "NEXT" key 143 is pressed, a command signal for checking the reserved contents is transmitted from the remote commander 10 to the VTR main unit 1. When the command signal is transmitted from the remote commander 10 to the VTR main unit 1, the transmission message indication 168, as shown in FIG. 16B, is indicated on the character indicating portion 120. Thus, the reserved contents stored in the timer memory 18 of the VTR main unit 1 are detected. Thereafter, the signal representing the reserved contents is transmitted from the VTR main unit 1 to the remote commander 10. When the signal is sent back to the remote commander 10 from the VTR main unit 10, a reception message indication 192, as shown in FIG. 16C, is indicated on the character indicating portion 120. Thereafter, as shown in FIG. 16D, the reserved contents for a first program are indicated on the character indicating portion 120. When the "NEXT" key 143 is further pressed, a command signal for checking the reserved contents is transmitted from the remote commander 10 to the VTR main unit 1. Thereafter, the reserved contents stored in the timer memory 18 are detected. A signal representing the reserved contents is sent back from the VTR main unit 1 to the remote commander 10. Thereafter, whenever the "NEXT" key is pressed, the reserved contents for the second program, the third program, and so forth are indicated on the character indicating portion 120, one after the other.

Figure 17A:
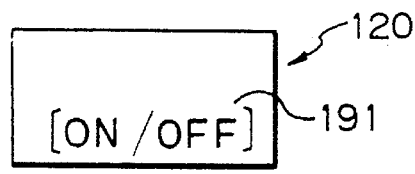
FIGS. 17A to 17I are pictorial representations showing changing the reserved contents of the memory.
Figure 17F:
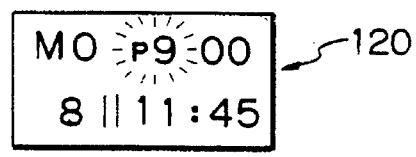
Figure 17B:
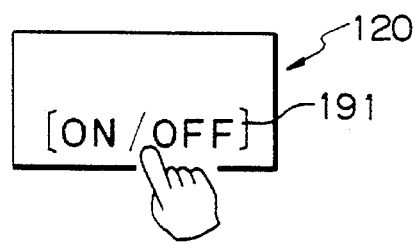
Figure 17G:
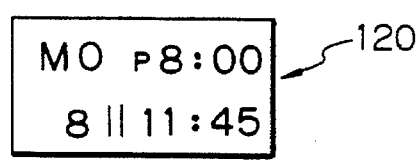
Figure 17C:
Figure 17H:
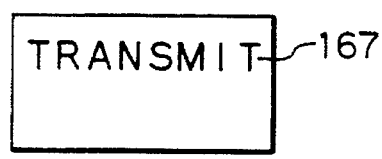
Figure 17D:
Figure 17I:
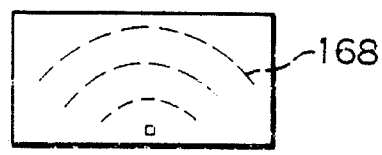
Figure 17E:
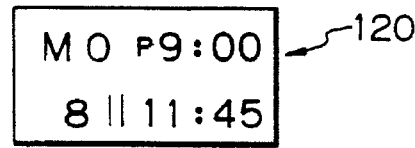

In addition, when the remote commander 10 is entered into the [TIMER CHECK] mode 104, the reserved contents can be changed. For example, when the remote commander 10 is entered into the [TIMER CHECK] mode 104, the [ON/OFF] indication 191, as shown in FIG. 17A, is indicated on the character indicating portion 120. Thereafter, as shown in FIG. 17B, when the [ON/OFF] indication 191 is pressed, the record reservation state is cancelled. When the "NEXT" key 143 is pressed, a command signal for checking the reserved contents is transmitted from the remote commander 10 to the VTR main unit 1. Thereafter, the transmission message indication 168, s shown in FIG. 17C, is indicated and then the reserved contents stored in the timer memory 18 of the VTR main unit 1 are detected. Thereafter, a signal representing the reserved contents is set back to the remote commander 10 from the VTR main unit 1, and the reception message indication 192 shown in FIG. 17D is indicated. Whenever the "NEXT" key 143 is pressed, as shown in FIG. 17E, the reserved contents of the first, second, third . . . program are indicated on the character indicating portion 120, one after the other. When the character of a desired program number is indicated and then the character indication of the item to be changed is pressed, as shown in FIG. 17F, the character of the item blinks. As shown in FIG. 17G, the contents of the portion that blinks is changed with the operation of the up/down keys 144 and the channel up/down keys 145. After the contents are checked and the "YES" key 124A is pressed, the message "TRANSMIT" 167 is indicated on the character indicating portion 120, as shown in FIG. 17H. When the "YES" key 124A is pressed, the command signal is transmitted to the VTR main unit 1. In addition, the transmission message indication 168, as shown in FIG. 17I, is indicated on the character indicating portion 120. Thus, the time set in the timer memory 18 of the VTR main unit 1 is changed.

Because signals are bidirectionally exchanged between the remote commander 10 and the VTR main unit 1, the reserved contents stored in the timer memory 18 of the VTR main unit 1 can be indicated on the character indicating portion 120 of the remote commander 10. In addition, when the contents set in the timer memory 18 of the VTR main unit 1 are sent back to the remote commander 10, the time can be set on the remote commander 10 and thereby the resultant time can be set in the timer memory 18 of the VTR main unit 1.

q. Operations of other devices.

Figures 18, 19:
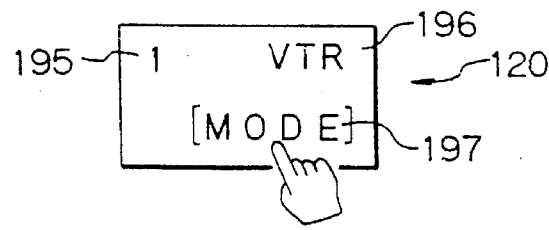
FIG. 18 is a pictorial representation showing the setting of another device.
FIG. 19 is a chart representing the operation of various other devices.

The memory of the remote commander 10 stores command signals for operating another television and another VTR, so that when the remote commander 10 is entered into the command mode 111, another television and another VTR can be operated. For example, when the remote commander 10 is entered into the command mode 11, as shown in FIG. 18, a number indication 195, a device indication 196, and a [MODE] indication 197 are indicated on the character indicating portion 120. When the [MODE] indication 197 is pressed, the kind of device, that is, either a television or a VTR, is set. By entering a preassigned manufacturer number using keys 152 corresponding to the numerals "1" to "12", the manufacturer of the device is set.

The numbers of the keys that are to be pressed to identify the manufacturers are shown, for example, in FIG. 19. Each manufacturer number relates to both a television and a VTR, so that the operability is improved. Thereafter, the "YES" key 124A is pressed. Thus, using the remote commander 10 another device, such as a VTR and a television made by another manufacturer, can be operated.

According to the present invention, data can be bidirectionally exchanged between the remote commander 10 and the VTR main unit 1. Thus, the setting state of the VTR main unit 1 can be indicated on the character indicating portion 120 of the remote commander 10, so that the setting state of the VTR main unit 1 can be checked on the remote commander 10. In addition, after the setting of the VTR main unit 1 is checked on the remote commander 10, the setting state of the VTR main unit 1 can be changed using only the remote commander 10.

Moreover, when a command signal is transmitted from the remote commander 10 to the VTR main unit 1 the transmission message indication 168 is indicated on the character indicating portion 120. On the other hand, when a signal representing the setting state is received at the remote commander 10 from the VTR main unit 1 the reception message indication 192 is indicated on the character indicating portion 120. Thus, the communication state between the remote commander 10 and the VTR main unit 1 can be checked.

Having described preferred embodiments with reference to the accompanying drawings, it is to be understood that the invention is not limited to those precise embodiments and that various changes and modifications could be effected by one skilled in the art without departing from the spirit or scope of the novel concepts of the invention, as defined in the appended claims.

What is claimed is:

1. A remote control system comprising:

a remote commander with a central processing unit and a battery mount detection means connected to said central processing unit;

a non-volatile memory connected to the central processing unit;

an electronic device main unit; and infra-red, bi-directional data link means;

said infra-red, bi-directional data link means adapted to allow communication between said remote commander and said electronic device main unit and including a user operable transmitter and a receiver in said remote commander and an automatic transmitter and a receiver in said electronic device main unit;

wherein when a user operates said user operable transmitter, said remote commander transmits via said infra-red, bi-directional data link means at least one command signal selected from a group of command signals which is received by said receiver in said electronic device main unit for controlling the operation of the electronic device main unit, and said automatic transmitter in said electronic device main unit transmits a status signal via the infra-red, bi-directional data link means, the status signal received by said receiver in said remote commander to indicate an operating status of said electronic device main unit, said remote commander including a display controlled by said central processing unit for indicating the operating status of said electronic device main unit for permitting the user to determine the operation status of the electronic device main unit, wherein said remote commander is battery powered, wherein said battery mount detection means signals the central processing unit with a battery present signal regarding the presence of a battery mounted in said remote commander, and wherein said central processing unit stores a previously received battery present signal or a signal indicative of a battery absent condition in the non-volatile memory as a preceding battery mount condition signal; and whereby the central processing unit determines if the non-volatile memory contains a battery present signal or a signal indicative of a battery absent condition as the preceding battery mount condition signal and the central processing unit prevents the transmission of selected command signals chosen from said group of command signals from the remote commander to the electronic device main unit when the central processing unit determines that the signal indicative of a battery absent condition was stored in the non-volatile memory as the preceding battery mount condition signal and the currently received signal is a battery present signal.

2. A remote control system comprising:

a remote commander with first input means, first sound producing means, a central processing unit, and battery mount detection means connected to said central processing unit;

a non-volatile memory connected to said central processing unit;

an electronic device main unit with second input means and second sound producing means; and infra-red, bi-directional data link means;

said infra-red, bi-directional data link means providing communication between said remote commander and said electronic device main unit and including a user operable transmitter connected to the first input means and a receiver in said remote commander and an automatic transmitter and a receiver in said electronic device main unit;

wherein when a user operates the first input means to thereby operate said user operable transmitter, said remote commander transmits via said infra-red, bi-directional data link means at least one command signal selected from a group of command signals which is received by said receiver in said electronic device main unit, and said automatic transmitter in said electronic device main unit transmits a status signal via the infra-red, bi-directional data link means, the status signal received by said receiver in said remote commander to indicate an operating status of said electronic device main unit, said remote commander including a display for indicating the operating status of said electronic device main unit for permitting a user to determine the operation status of the electronic device main unit, wherein said first sound producing means produces a first operational sound audible to the user thereof upon the actuation of said first input means included in said remote commander, and said second sound producing means produces a second operational sound audible to the user thereof upon actuation of the second input means included on the electronic device main unit, to allow the user to differentiate operation of the remote commander from operation of the electronic device main unit;

wherein said remote commander is battery powered, wherein said battery mount detection means signals the central processing unit with a battery present signal regarding the presence of a battery mounted in said remote commander, and wherein the central processing unit stores a previously received battery present signal or a signal indicative of a battery absent condition in the non-volatile memory as a preceding battery mount condition signal; and whereby the central processing unit determines if the non-volatile memory contains a battery present signal or a signal indicative of a battery absent condition as the preceding battery mount condition signal and the central processing unit prevents the transmission of selected command signals chosen from said group of command signals from the remote commander to the electronic device main unit when the central processing unit determines that the signal indicative of a battery absent condition was stored in the non-volatile memory as the preceding battery mount condition signal and the currently received signal is a battery present signal.

3. A remote control system comprising:

a remote commander with a central processing unit and battery mount detection means connected to the central processing unit;

a non-volatile memory connected to the central processing unit;

an electronic device main unit with a front panel operable between an open and a closed position, the front panel comprising a touch panel having a plurality of touch-actuated switches;

means for releasing said front panel from said closed to said open position; and infra-red, bi-directional data link means;

said infra-red, bi-directional data link means adapted to allow communication between said remote commander and said electronic device main unit and including a user operable transmitter and a receiver in said remote commander and an automatic transmitter and a receiver in said electronic device main unit;

wherein when a user operates said user operable transmitter, said remote commander transmits via said infra-red, bi-directional data link means at least one command signal selected from a group of command signals which is received by said receiver in said electronic device main unit, and said automatic transmitter in said electronic device main unit transmits a status signal via the infra-red, bi-directional data link means, the status signal received by said receiver in said remote commander to indicate an operating status of said electronic device main unit, said remote commander including a display for indicating the operating status of said electronic device main unit for permitting a user to determine the operation status of the electronic device main unit, wherein said means for releasing said front panel from said closed position to said opened position is actuated by a command transmitted over said infra-red, bi-directional data link means from said remote commander to said electronic device main unit;

wherein said remote commander is battery powered, wherein said battery mount detection means signals the central processing unit with a battery present signal regarding the presence of a battery mounted in said remote commander, and wherein the central processing unit stores a previously received battery present signal or a signal indicative of a battery absent condition in the non-volatile memory as a preceding battery mount condition signal; and whereby the central processing unit determines if the non-volatile memory contains a battery present signal or a signal indicative of a battery absent condition as the preceding battery mount condition signal and the central processing unit prevents the transmission of selected command signals chosen from said group of command signals from the remote commander to the electronic device main unit when the central processing unit determines that the signal indicative of a battery absent condition was stored in the non-volatile memory as the preceding battery mount condition signal and the currently received signal is a battery present signal.

4. The remote control system as set forth in claim 3, wherein said front panel is transparent or translucent and said electronic device main unit includes indicators visible through said front panel while in said closed position.

5. The remote control system as set forth in claim 4, wherein said electronic device main unit includes sound producing means for producing an operational sound audible to the user upon actuation of one of said plurality of touch-actuated switches.

* * * * *